US008811572B2

(12) United States Patent  (10) Patent No.: US 8,811,572 B2
Deich et al.  (45) Date of Patent: *Aug. 19, 2014

(54) SYSTEMS AND METHODS FOR EXCHANGING CALL ROUTING POLICIES FOR VOICE OVER IP CALLS

(71) Applicant: Connexon Telecom, Inc, Montreal (CA)

(72) Inventors: Lev Deich, Hampstead (CA); Michael Proctor, St-Laurent (CA)

(73) Assignee: Connexon Telecom, Inc., Montreal, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,328

(22) Filed: Aug. 6, 2013

(65) Prior Publication Data

US 2014/0126569 A1  May 8, 2014

Related U.S. Application Data

(63) Continuation of application No. 13/667,829, filed on Nov. 2, 2012, now Pat. No. 8,526,576.

(51) Int. Cl.
 *H04M 11/00* (2006.01)
(52) U.S. Cl.
 USPC .......................................................... 379/45
(58) Field of Classification Search
 USPC ..................................................... 379/45, 37
 See application file for complete search history.

(56) References Cited

U.S. PATENT DOCUMENTS

| 8,165,560 B2 | 4/2012 | Stenquist |
| 8,526,576 B1 * | 9/2013 | Deich et al. ............... 379/45 |
| 2006/0067486 A1 | 3/2006 | Zellner et al. |
| 2006/0233317 A1 | 10/2006 | Coster et al. |
| 2008/0065775 A1 | 3/2008 | Polk |
| 2012/0259984 A1 | 10/2012 | Marshall et al. |

OTHER PUBLICATIONS

US Notice of Allowance in U.S. Appl. No. 13/667,829 Dtd Jun. 6, 2013.
US Office Action in U.S. Appl. No. 13/667,829 Dtd Feb. 15, 2013.

* cited by examiner

*Primary Examiner* — Stella Woo
(74) *Attorney, Agent, or Firm* — Christopher J. McKenna; Foley & Lardner LLP

(57) ABSTRACT

An emergency call handling system can provide emergency call routing and processing that compliments or modifies the routing and processing provided by conventional enhanced 911 (E-911) and next generation 911 (NG-911) systems. Both the routing and processing can be based on rule sets detailed in emergency call handling profiles (ECHPs). Any entity (e.g., SIP servers, switches, terminals, etc.) within the system can process and route the emergency call by executing the rule sets within the ECHPs associated with the call. The ECHPs are delivered to the entities within the system by value or by reference. A SIP server, e.g., may execute all or a subset of the rule set, and may communicate with an application server to execute other subsets of the rule set.

20 Claims, 18 Drawing Sheets

SYSTEMS AND METHODS FOR EXCHANGING CALL ROUTING POLICIES FOR VOICE OVER IP CALLS

RELATED APPLICATION

The present application claims priority to and is a continuation of U.S. Non-provisional application Ser. No. 13/667,829, entitled "Systems and Methods For Exchanging Call Routing Policies For Voice Over IP Calls", and filed on Nov. 2, 2012, which is incorporated herein by reference in its entirety for all purposes.

FIELD OF THE INVENTION

The present application generally relates to data communication networks. In particular, the present application relates to systems and methods for exchanging call routing policies for voice over IP (VOIP) calls.

BACKGROUND OF THE INVENTION

An emergency call handling system can route an emergency call received from a caller to an appropriate public safety answering point (PSAP). The emergency call is routed by various servers or switches within the emergency call handling system. However, when processing in addition to routing is desired from these servers or switches, their configuration becomes very difficult or even impossible.

BRIEF SUMMARY OF THE INVENTION

An emergency call handling system can provide emergency call routing and processing that compliments or modifies the routing and processing provided by conventional enhanced 911 (E-911) and next generation 911 (NG-911) systems. In the emergency call handling system discussed herein, both the routing and processing can be based on rule sets detailed in emergency call handling profiles (ECHPs) associated with an emergency call. Any entity (e.g., servers, switches, terminals, etc.) within the system can process and route the emergency call by executing the rule sets in the ECHPs associated with the call. The ECHPs are delivered to the entities within the system by value or by reference. When delivered by value, the ECHPs for a particular emergency call are contained within messages that are used to initiate or maintain a call. On the other hand, when delivered by reference, a reference, such as a network link to an ECHPs database, to the ECHPs is contained within the messages.

In some aspects, the present solution is directed to performing additional processing by intermediary switches to complement or modify the E-911 and NG-911 call processing behavior using a defined rule-set. The rule-set may include call processing rules to issue notifications such as but not limited to any of the following:

1) Emergency Call Monitoring (bridging in a designated phone number with 1 way audio only to listen in).

2) Emergency Call Bridging (bridging in a designated phone number with 2 way audio to participate on the call).

3) Email notification (send an email to a designated distribution list with specific information).

4) Short Message Service (SMS) notification (send a short message service message to a designated distribution list with specific information).

5) Desktop Screen Pop notifications (issue a screen pop on a designated workstation with notification capabilities).

6) Visual alarms (issue a trigger to enable flashing screens, LED display, phone screen display).

7) Audio alarms (issue a trigger to enable sirens, play audio message on a designated phone).

8) Misdial protection (play an audio message to the emergency caller informing them they are about to be connected to emergency services, therefore giving the caller the opportunity to hang-up if they dialed the emergency number by accident; also playing the message in the language configured for/appropriate to the physical location, end user or other signaled attribute).

9) Call Recording (audio recording for the emergency call for legal/investigative/audit purposes if the customer does not have such facilities themselves).

10) Indicate particular PIDF-LO location object handling rules, especially if different from the recommendations in RFC5491 or as previously mandated in other specifications such as NENA i3 to allow flexibility in handling multiple client/server types with differing support of location object ordering and/or PIDF-LO handling rules (e.g. prioritize Geoshape object over civic address, device location object takes precedence over person location object).

11) Indicate particular PIDF-LO location object insertions, deletions or translations based upon the User Agent making the emergency call and/or SIP servers, (e.g. inserting a PIDF-LO object based upon uniquely identifying the User Agent at call time and associating it to a known location in instances where the User Agent does not support PIDF-LO; or concatenating multiple PIDF-LO fields (e.g. BLD, FLR and ROOM into the LOC field) defined in different RFC standards to support handling and interoperability with the emergency call handling network; or matching the PIDF-LO information against a unique location key provided by the emergency call handling network authority and including this key in a particular PIDF-LO field (e.g. ADDCODE) before transmitting to the emergency call handling network), which allows flexibility in handling multiple client/server types and emergency call handling network capabilities with differing support for PIDF-LO field interpretation and representation.

12) Indicate particular SIP header insertions, deletions or translations based upon the User Agent making the emergency call and/or SIP servers, (e.g. inserting a P-Asserted Identity field which contains the emergency callback number if one is not present to ensure correct handling and interoperability with the emergency call handling network), which allows flexibility in handling multiple client/server types with differing support for callback number representation.

13) Indicate callback options not available via FROM/P-AI fields, e.g. fallback callback number (security desk, nursing station on site, administrator to call between dates/times).

14) Test Call (special usage-indication to downstream systems that this call is not an emergency but should be processed like an emergency call for the purposes of testing call, location and callback number conveyance, e.g. when installing a new/upgraded voice system at an enterprise before the system goes live, or modifying an existing live voice system or the underlying network which may affect emergency call processing).

15) Indicate Routing Rules dependent on location or other rules (e.g. force calls to go to an Emergency Response Call Center in times of natural disaster or when routing errors have been detected, direct call delivery to security desk for secure areas where the enterprise may have special dispensation for emergency call handling).

The present solution offers a new and innovative way of acquiring, sharing, and distributing these complex rules across multiple soft switches, intermediary devices and providers. The present solution enables and provides this additional processing for rule sets that vary based on caller's geographic location or any physical or logical attribute of the physical device or caller. The present solution enables and provides this additional processing for rules which include many configuration parameters and may become very complex as they may be based on time-of-day, availability of a feature at a specific site, etc.

The present solution addresses this problem by allowing a voice endpoint (or a proxy on its behalf) to acquire an emergency call handling profile (ECHP) based on specific criteria. An ECHP includes an extensive rule set and parameters for E-911/NG-911 processing. The device (or its proxy) may deliver the ECHP or a URL of the ECHP in the SIP header. As the call progresses to the destination via various switches, the switch may obtain the ECHP and if required and capable, execute one or more applicable rules. This present solutions allows E-911 and NG-911 calls to be processed using complex rules based on vendor proprietary parameters that could be executed by various switches along the call path. The present solution supports and may be based on NENA i2 and i3 standards for E-911 and NG-911 call delivery using SIP and conveying location data either by value or reference.

In some aspects, the present solution is directed to a method for processing an emergency service call based on the ECHP. The method includes obtaining, by a SIP server that is responsive to a SIP request for a call to an emergency service, the ECHP for the call from the ECHP database. The ECHP can include a rule set for handling an emergency call. The method also includes the SIP server identifying one or more instructions of the rule set, and initiating execution of the one or more instructions. The SIP server may communicate with an application server to execute one or more instructions included in the ECHP and/or the SIP server may execute one or more of the instructions. The method further includes the SIP server terminating the call with a public safety answering point (PSAP), such as responsive to or after completion of the processing of the rules and/or execution of the instruction(s).

In some embodiments, the method includes the SIP server identifying a uniform resource locator (URL) within the SIP request, the URL indicating an ECHP database where the ECHP is stored. The SIP server then uses the URL to obtain the ECHP from the ECHP database. In some embodiments, the URL may be embedded in a presence information location object of the SIP server.

In some aspects, the present solution is directed to a system for processing an emergency service call based on an ECHP. The system includes an ECHP database that stores a number of ECHPs, where each ECHP includes rules for handling an emergency service call. The system also includes a SIP server that receives a SIP request associated with the emergency service call, and communicates with the ECHP database to obtain the ECHP for the emergency service call. The SIP server may initiate execution of the instruction(s) included in the ECHP. For example, the SIP server may communicate with an application server to execute one or more instructions included in the ECHP and/or the SIP server may execute one or more of the instructions. Responsive to completing and/or after the processing of the rules and/or execution of the instruction(s), the SIP server terminates the received emergency service call with a PSAP.

In some embodiments, the system also includes a second SIP server that is configured to determine location information of the device making the emergency service call, and communicating with the ECHP database with the location information of the device. The ECHP database, in turn, selects the ECHP based on the location information of the device and returns a URL for the ECHP to the second SIP server. Moreover, the SIP server inserts the URL in a header of the SIP request and forwards the SIP request to the SIP server.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

The features and advantages of the present invention will become more apparent from the detailed description set forth below when taken in conjunction with the drawings, in which like reference characters identify corresponding elements

DETAILED DESCRIPTION OF THE INVENTION

For purposes of reading the description of the various embodiments below, the following descriptions of the sections of the specification and their respective contents may be helpful:
- Section A describes a network environment and computing environment which may be useful for practicing embodiments described herein;
- Section B describes embodiments of systems and methods for processing emergency calls using emergency call handling profile information;
- Section C describes embodiments of an emergency call handling profile; and
- Section D describes embodiments of methods executed by an SIP server for processing emergency calls using emergency call handling profile information.

A. Network and Computing Environment

Figure 1A:
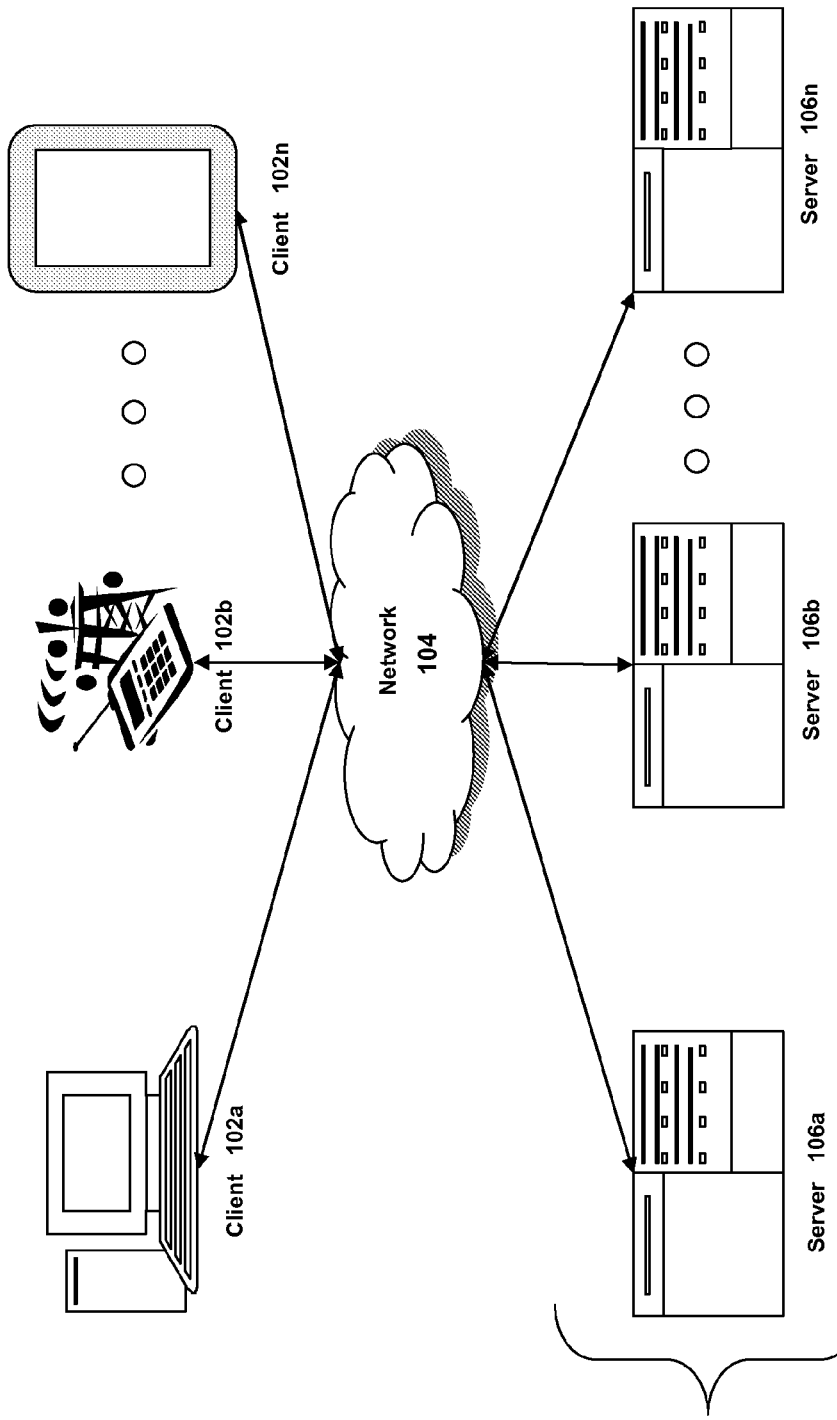
FIG. 1A is a block diagram of an embodiment of a network environment for a client to access a server.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include Bluetooth, Wi-Fi, Worldwide Interoperability for Microwave Access (WiMAX), an infrared channel or satellite band. The wireless links may also comprise of any cellular network standards used to communicate among mobile devices, including standards that qualify as 1G, 2G, 3G, or 4G. The network standards may qualify as one or more generation of mobile telecommunication standards by fulfilling the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards use different channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers of stacks of protocols, including e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the Hyper-V hypervisors provided by Microsoft or others. Hosted hypervisors may run within an operating system on a second software level. Examples of hosted hypervisors may include VMware Workstation and VirtualBox.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
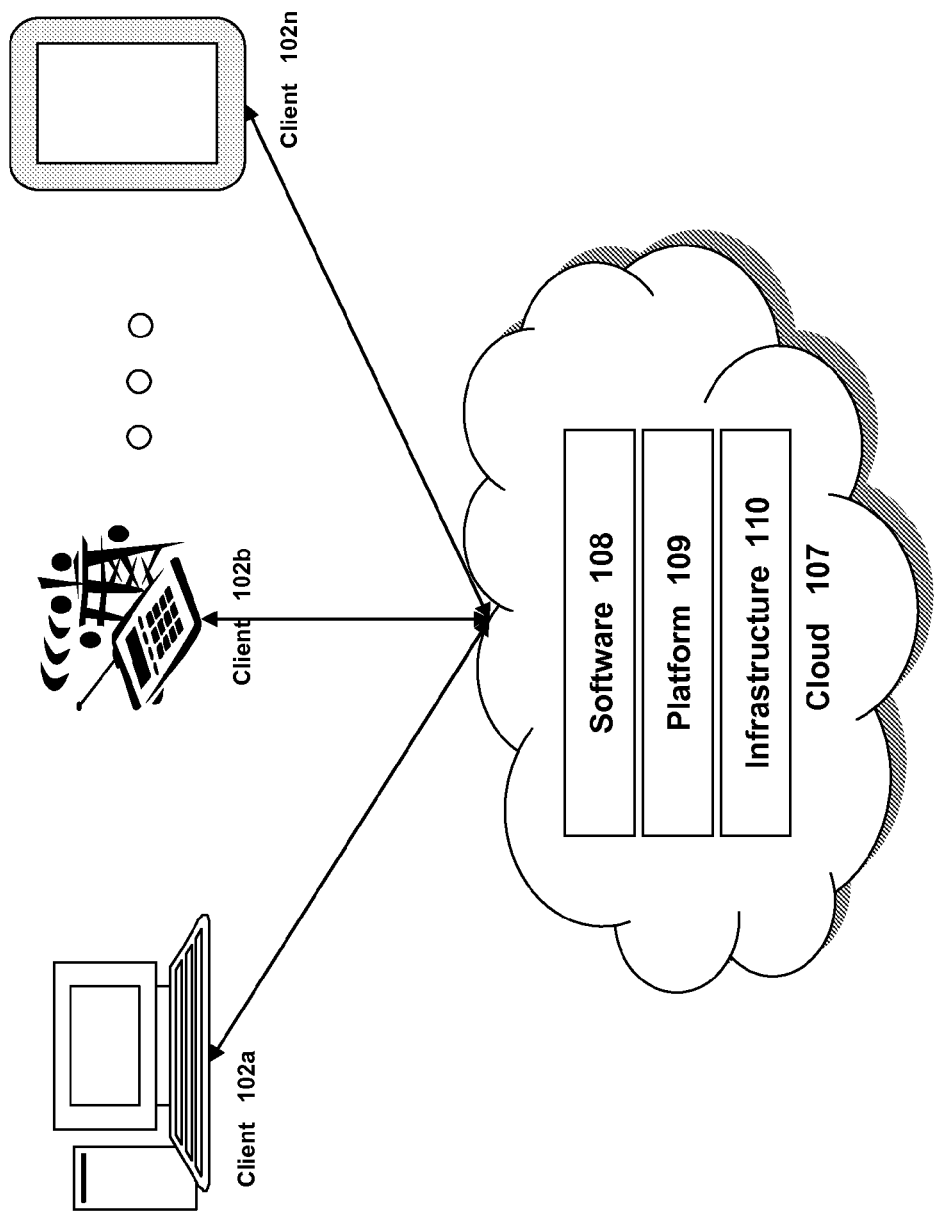
FIG. 1B is a block diagram of an embodiment of a computing environment.

Referring to FIG. 1B, a cloud computing environment is depicted. A cloud computing environment may provide the client 102 with the same resources as a network environment. The cloud computing environment includes one or more front end clients 102a-102n, in communication with the cloud 107 over one or more networks 104. Front end clients 102 include thick clients, thin clients, and zero clients. A thick client 102 may offer many functionality even when disconnected from the cloud 107 or servers 106, and a thin client or a zero client may depend on the connection to the cloud 107 or server 106 to provide functionality. A zero client may depend on the cloud 107 or other networks 104 or servers 106 to retrieve operating system data for the client device. The network 104 may be internet, intranet, any networks described herein, or any other type of network. The cloud includes back end platforms, e.g., servers 106 and storage, server farms 38 or data centers.

The cloud 107 may be public, private, or hybrid. Public clouds may include public servers 106 that are maintained by third parties to the clients 102 or the owners of the clients, where the servers 106 or server farms 38 and data centers may be located off-site in remote geographical locations as disclosed above or otherwise. Public clouds may be connected to the servers 106 over a public network e.g. the internet. Private clouds may include private servers 106 that are physically maintained by clients 102 or owners of clients, where the servers 106 may be physically located on the premise. Private clouds may be connected to the servers 106 over a private network 104 e.g. an intranet network. Hybrid clouds 107 may include both the private and public networks 104 and servers 106.

The cloud 107 may also include a cloud based delivery, e.g. Software as a Service (SaaS) 108, Platform as a Service (PaaS) 109, and Infrastructure as a Service (IaaS) 110. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include Amazon Web Services, Rackspace Cloud, Google Compute Engine, or RightScale. PaaS providers may offer the resources that IaaS provides, including storage, networking, servers or virtualization, as well as additional resources including e.g. the operating system, middleware, and runtime resources. Examples of PaaS include Windows Azure, Google App Engine, and Heroku. SaaS providers may offer the resources that PaaS provides, including storage, networking, servers, virtualization, operating system, middleware, and runtime resources, as well as additional resources including data and application resources. Examples of SaaS include Google Apps, Salesforce, or Office 365. Examples of SaaS may also include data storage providers, e.g. Dropbox, Microsoft SkyDrive, Google Drive, or Apple iCloud.

Clients 102 may access IaaS resources with different IaaS standards e.g. Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use http packages, standard Java APIs, JavaMail API, Java Data Objects (JDO), Java Persistence API (JPA), Python APIs, web integration APIs for different programming languages including e.g. Rack for Ruby, WSGI for Python, or PSGI for Perl, or other APIs that may be built on REST, HTTP, XML, or other protocols. Clients 102 may access SaaS resources through the use of web-based user interfaces, on web browsers including e.g. Google Chrome, Microsoft Internet Explorer, or Mozilla Firefox. Clients 102 also access SaaS resources through smartphone or tablet apps, including e.g. Salesforce Sales Cloud, or Google Drive app. Clients 102 may also access SaaS resources through the client operating system, including e.g. Windows file system for Dropbox.

Access to IaaS, PaaS, or SaaS resources may be authenticated by, e.g., security certificates, HTTPS, or API keys. Developers may use API keys with different encryption standards including, e.g., Advanced Encryption Standard (AES). Data resources may be sent over Transport Layer Security (TLS) or Secure Sockets Layer (SSL).

Figure 1C:
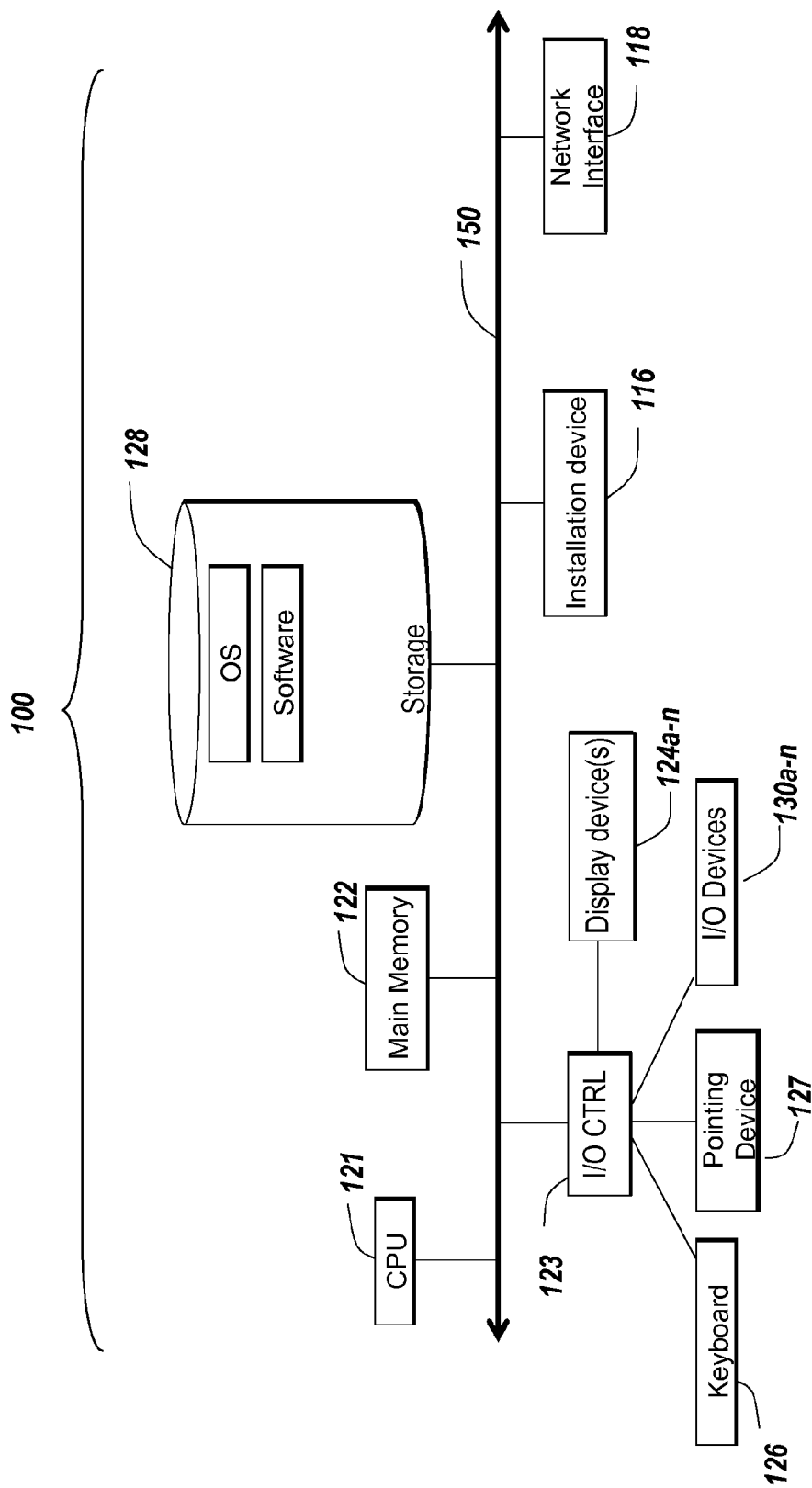
FIG. 1C is a block diagram of an embodiment of a computing device.
Figure 1D:
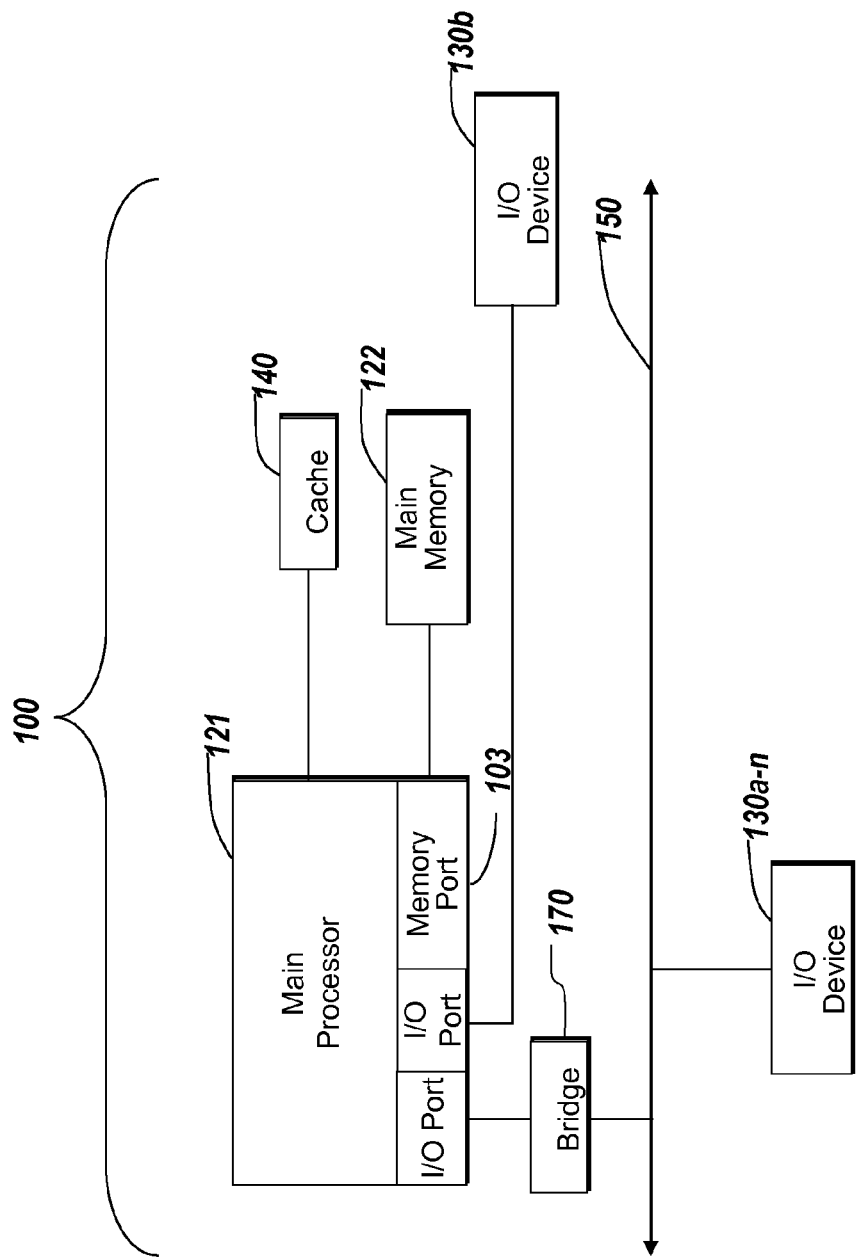
FIG. 1D is a block diagram of another embodiment of a computing device.

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may contain, without limitation, an operating system, and software. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and Tegra system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. An example of a multi-core processor is the AMD Phenom IIX2 or Intel Core i5 or Core i7.

Main memory unit 122 may be one or more memory chips capable of storing data and allowing any storage location to be directly accessed by the microprocessor 121. Main memory unit 122 may be volatile and faster than storage 128 memory. Main memory units may be Dynamic random access memory (DRAM) or any variants, including static random access memory (SRAM), Burst SRAM or Synch-Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, touchpads, touch mice, multi-touch touchpads and touch mice, microphones, multi-array microphones, drawing tablets, cameras including e.g. CMOS sensors, accelerometers, infrared optical sensors, pressure sensors, magnetometer sensors, angular rate sensors, depth sensors, proximity sensors, ambient light sensors, gyroscopic sensors, or other sensors. Output devices include video displays, speakers, headphones, inkjet printers, laser printers, and 3D printers.

Some devices 130a-130n may combine multiple input or output devices, including e.g. Microsoft Kinect, Nintendo Wiimote, or Apple iPhone. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including e.g. Microsoft Kinect, Siri for iPhone by Apple, Google Now or Google Voice Search.

Additional devices 130a-130n have both input and output capabilities, including e.g. haptic feedback devices, touch screen displays, or multi-touch displays. Touch screen, multi-touch displays, touchpads, touch mice, or other touch sensing devices may use different technologies to sense touch, including e.g. capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including e.g. pinch, spread, rotate, scroll, or other gestures. Some touch screen devices, including e.g. Microsoft PixelSense or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices e.g. a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controllers 123. Display devices may include liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OpenGL or DirectX API or other graphics libraries.

In some embodiments, the I/O controller 123 may be a smart TV or a digital media receiver, that is connected to a display device 124a that is a television. Examples may include Boxee, a freeware home theater PC software developed by Apple TV by Apple; Boxee, Inc.; Google TV, an Android based platform by Google, among others. Some video game consoles, such as Playstation 3 or Xbox 360, may have many of the features of a smart tv. Some embodiments allow the user to connect to media streaming or purchasing services through the network 104. Some embodiments may allow the user to connect other computing devices 100 to stream media, either through wired connections, through a network 104 including e.g. a WiFi network. Examples include AirPlay mirroring for Apple devices or Nexus Q for Android version devices.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, e.g. computing devices 100a and 100b connected to the computing device 100, for example, via a network. These embodiments may include any type of software designed and constructed to use another computer's display device as a second display device 124a for the computing device 100. For example, in one embodiment, an Apple iPad may be connected to a computing device 100 and used as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128, e.g. one or more hard disk drives or redundant arrays of independent disks, for storing an operating system and other related software, and for storing application software programs. Examples of storage device 128 includes e.g. hard disk drive (HDD); optical drive including CD drive, DVD drive, or Blu Ray drive; solid-state drive (SSD); USB flash drive; or any other device suitable for storing data. Some storage device 128 may be non-volatile, mutable, ore read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including e.g. the Remote Disk for MacBook Air by Apple. Some client devices 100 may not require a non-volatile storage device 128 and may be thin clients or zero clients 102. Some storage device 128 may also be used as a installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform, including e.g. Apple App Store for iOS, Google Play for Android OS, Chrome Webstore for Chrome OS, or Amazon Appstore for Android OS and Kindle Fire. An application distribution platform may install software for client devices 100 such as Google Android mobile devices such as Google Nexus smartphones or tablet devices; Apple iPhone or iPad devices; and Google Chromebooks, or on the Chrome web browser enabled devices, among other devices. An application distribution platform may include a repository of application, means of first and third party developers to submit applications, an application approval process, a means of purchasing a selected application by the user, user reviews and ratings of applications, popular applications, a database of purchased or installed applications by any users, among other features.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, ExpressCard network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1C and 1D typically operates under the control of operating systems, which control scheduling of tasks and access to system resources. The computing device 100 can be running any operating system e.g. any of the versions of the MICROSOFT WINDOWS operating systems, the different distributions of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, and WINDOWS 8 all of which are manufactured by Microsoft Corporation of Redmond, Wash.;

MAC OS and iOS, manufactured by Apple Computer of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including e.g. the Chrome OS by Google, may be used on zero clients or thin clients, including e.g. Chromebooks.

The computer system 100 can be any workstation, telephone, desktop computer, laptop or notebook computer, netbooks, tablets, server, handheld computer, mobile telephone, smartphones or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones can be controlled using the touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, or a NINTENDO WII device manufactured by Nintendo Co., Ltd., of Kyoto, Japan, an XBOX 360 device manufactured by the Microsoft Corporation of Redmond, Wash.

In some embodiments, the computing device 100 is a digital audio player e.g. the Apple IPOD, IPOD Touch, and IPOD NANO lines of devices, manufactured by Apple Computer of Cupertino, Calif. Some digital audio players may have other functionality, including e.g. a gaming system or any functionality made available by an application from a digital application distribution platform. For example, the IPOD Touch may access the Apple Appstore. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple Computer; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

It should be understood that the systems described herein may provide multiple ones of any or each of those components and these components may be provided on either a standalone machine or, in some embodiments, on multiple machines in a distributed system. Any portions or components of the systems described herein may be implemented or deployed on a cloud 107, such as via software 108, platform 109 and infrastructure 110. The systems and methods described herein may be implemented as a method, apparatus or article of manufacture using programming and/or engineering techniques to produce software, firmware, hardware, or any combination thereof. In addition, the systems and methods described herein may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

B. Emergency Call Handling System Using Emergency Call Handling Profiles

Figure 2A:
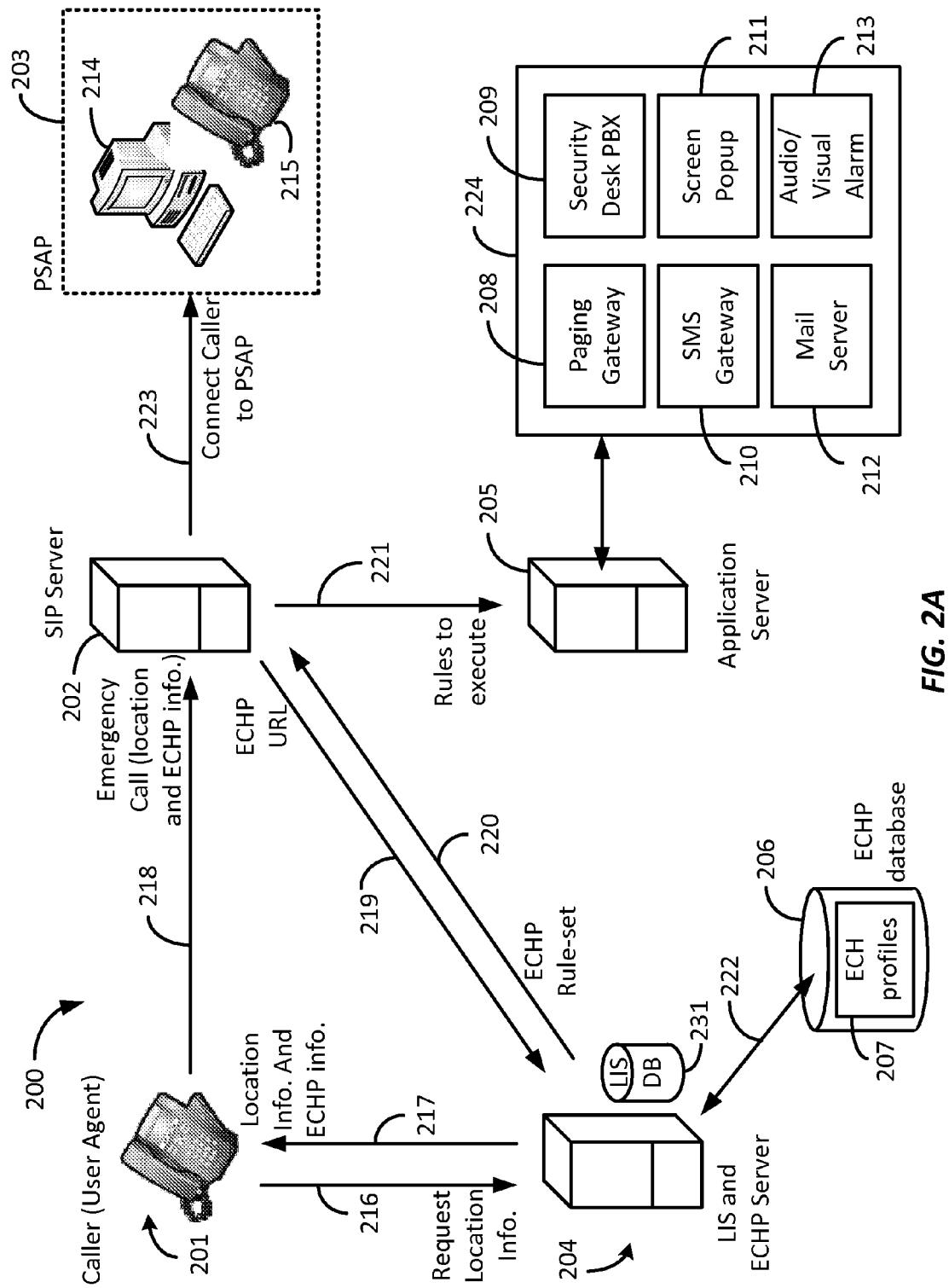
FIG. 2A is a block diagram of a system showing exchange of emergency call handling profile (ECHP) information.

FIG. 2A depicts an embodiments of an exchange of emergency call handling policies (ECHP) for VOIP-SIP based calls within a system 200. The system 200 includes a VOIP terminal (or user agent) 201, a session initiation protocol (SIP) server 202, a location information server (LIS) and emergency call handling profile (ECHP) server 204, an ECHP database 206, a public safety answering point (PSAP) 203, and an application server 205 communicating with a set of application modules 224. The various entities shown in FIG. 2A can communicate with each other over one or more communications network 104, e.g., the Internet. A person skilled in the art will appreciate that the Internet can be established over multiple private and public network service providers. For example, the caller 201 may be connected to the Internet over a private communication network provided by the VOIP service provider. However, any network that can at least support VOIP emergency calls may be employed.

The terminal 201 may comprise a VOIP terminal that allows a user to make VOIP calls, including VOIP emergency calls such as E-911 and NG-911 calls. The terminal 201 can include voice, video, and text capability. The terminal device may include a telephony device or application. The terminal 201 can be any type of device, such as any embodiments of client 102 designed and constructed to use or perform VOIP or otherwise to dial 911. The terminal 201 can also include applications or programs that provide establishing an emergency call via modes other than dialing. For example, the terminal 201 may include an application that accepts text, instant message, voice message, visual message, etc. from the caller and establishes an emergency call based on the content of the accepted messages.

Within the context of the SIP used by the terminal 201 to initiate, establish, and receive calls, the terminal 201 can be capable of acting as a user agent. The user agent may represent an endpoint of a connection and may be a logical entity that can act as both a client to send SIP requests and a server for responding to SIP requests. Additional information regarding the capabilities of a user agent can be found in the Internet Engineering Task Force (IETF) request for comments (RFC) 3261 (available on the IETF website), which is incorporated herein by reference in its entirety.

The terminal 201 communicates with the LIS and ECHP server 204 for requesting location and ECHP information associated with the terminal 201. The terminal 201 may send this request prior to initiating an emergency call. In some instances, the terminal 201 can send periodic requests (e.g., once every hour, day, etc.) for location and ECHP information during normal operation, and store the received information. The location information can include a civic address or geospatial location attributes that correspond to the physical location of the terminal 201. The location information can also include additional detailed information such as the building, floor, and room in which the terminal 201 is located. In some instances, the location information received by the terminal can be in the form of an extensible markup language (XML) document such as a presence information data/document format location object (PIDF-LO), or in the form of a location key (LK). The PIDF-LO includes civic address and geospatial locations within the XML document, and is used when the terminal 201 is capable of including the PIDF-LO within an emergency call initiation message sent to the SIP server 202. In instances where it may be preferred or desired that the LIS server store the location information on behalf of the terminal 201, the terminal 201 can instead include the LK within the emergency call initiation message, which LK can be used by the SIP server 202 to access location information of the terminal 201 from the LIS server 204.

In addition to the location information received from the LIS and ECHP server 204, the terminal 201 also receives ECHP information, which can be used by various entities within the system 202 for carrying out emergency call processing that compliments or modifies existing E-911 and NG-911 call processing behavior. The ECHP information received from the LIS and ECHP server 204 can be in the form of a set or rules or instructions or in the form of a link or identifier to the ECHP server 204, which link or identifier can be used by any entity in the system 200 to access the ECHP rules or instructions associated with the emergency call. In some embodiments, the ECHP references can be inferred from the LK. For example, a system may have a mapping between a LK and ECHP reference. One example of this mapping is the URL of the ECHP. The structure and contents of the ECHP is described in further detail below with reference to FIGS. 3A-3E.

As mentioned above, the terminal 201 may initiate an emergency call by sending an emergency call initiation message 218 to the SIP server. For example, the terminal 201 can send an SIP INVITE message to the SIP server 202, which is configured to receive emergency calls. The terminal 201 inserts the location and ECHP information, received from the LIS and ECHP server 204, within the emergency call initiation message 218. For example, the terminal 201 can include the PIDF-LO with ECHP within the body of the INVITE message sent to the SIP server 202.

Returning to the LIS and ECHP server 204, the location information server (LIS) may comprise any type and form of a network node that addresses the intermediate solution for providing E-911 and NG-911 service for users of VoIP telephony, such as for example the network node originally defined in the National Emergency Number Association i2 network architecture. The LIS may be the network node that determines the location of the VoIP terminal. The LIS may provide location information to any IP based device accessible via a network.

The ECHP server may comprise a server or application that stores, manages, controls and/or tracks one or more ECHPs. The ECHP server may comprise an application, program, library, script, task, service, process or any type and form of executable instructions. In some embodiments, the ECHP server may comprise a web server. In some embodiments, the ECHP server may comprise an application that is designed and constructed to support and process HTTP or HTTPS protocols. The ECHP server may comprise any type and form of interface, such as a web service or application programming interface (API) for entities and/or users to create, access, retrieve, obtains or manage one or more ECHPs. In some embodiments, the ECHP server is designed and constructed to or otherwise enables or allows a Location Policy Aware SIP Server to access a document, such as an ECHP, using HTTP, HTTPS or any other suitable protocols. The ECHP server could be a separate server or collocated with or on the LIS. In some embodiments, the ECHP server and LIS are combined into a single server.

The ECHP server may store and manage ECHPs in one or more databases. The ECHP server may store each ECHP in association with, identified by or indexed by one or more criteria. In some embodiments, an ECHP may be associated with, identified by or indexed by geography, such as a specific location or region. In some embodiments, an ECHP may be associated with, identified by or indexed by device information, such as a device type. In some embodiments, an ECHP may be associated with, identified by or indexed by access provider. In some embodiments, an ECHP may be associated with, identified by or indexed by service provider. In some embodiments, an ECHP may be associated with, identified by or indexed by time of day. In some embodiments, an ECHP may be associated with, identified by or indexed by application or application type. In some embodiments, an ECHP may be associated with, identified by or indexed by user or groups of users. In some embodiments, the ECHP may be organized, arranged, identified or indexed by features of rules of the ECHPs.

The ECHP server or database may select an ECHP based on any attributes or criteria. In some embodiments, the ECHP server or database may select the ECHP based on an attribute of the call, such as the location of the calling device or user agent. In some embodiments, the ECHP server or database may select the ECHP based on an attribute of the calling device. In some other embodiments the ECHP server may select the ECHP as per organization and/or organization subgroup of the caller, and/or as per the SIP server technology (vendor/model/version), and/or as per the identity of the caller, and/or date and time of the call.

One or more ECHP databases may be deployed or distributed on or across any entities in the system, such as a SIP server or application server. In some embodiments, the SIP server comprises the ECHP database. In these embodiments, the SIP server may comprise the functionality of the ECHP server to manage and access the ECHP database.

The LIS and ECHP server may respond to requests for location information received from the terminal 201 and to requests for ECHPs from the SIP server 202. When the LIS and ECHP server 204 receives a request 216 for location information from the terminal 201, the server responds 217 with the location information associated with the terminal 201 and with the ECHP information. Also, upon receiving a request 219 from the SIP server 202, the LIS and ECHP server 204 responds 220 with ECHP rules or instructions.

The LIS and ECHP server 204 also communicates with the LIS database 231 and the ECHP database 206 for accessing (reading and/or writing) the location information and ECHP information to be sent to the terminal 201 and the SIP server 202. In one example, the LIS and ECHP server can be a hyper text transfer protocol (HTTP) server, which supports HTTP enabled location delivery (HELD) protocol for delivering location information to the terminal 201. The HTTP server can also be used to respond to ECHP uniform resource locators (URLs) with appended query strings. Additional information on including query strings within URLs can be found in request for comments (RFC) 1738 and RFC 3986 (both available on the IETF website), which are incorporated herein by reference in their entirety.

In some embodiments, the LIS and ECHP server can support an extended HELD protocol, in which HELD requests received from the terminal 201 can include extensions. For example, the extensions to the HELD location information requests can include ECHP URL requests. In such embodiments, the LIS and ECHP server can respond to the terminal 201 with a ECHP URL in addition to the requested location information.

The SIP server 202 may comprise any type and form of device or application that supports, performs and processes Session Initiation Protocol (SIP) communications. The SIP server may comprise an application, program, library, script, task, service, process or any type and form of executable instructions. The SIP server may include a Private Branch Exchange (PBX). The SIP server may include a SIP proxy. The SIP server may include a business to business (B2B) user agent. The SIP server may include a VOIP based application. The SIP server may include a SIP based service or application. The SIP server may be designed and constructed to process VOIP or SIP based calls, such as E-911 and NG-911 calls.

The SIP Server may be designed and constructed to interface to, communicate with or integrate with the ECHP server and the use of ECHPs. The SIP server may be designed and constructed to detect, identify and/or retrieve the URL of the ECHP from the SIP signaling in a call, such as an E-911 or NG-911 call. The SIP server may use the URL of the ECHP to obtain the corresponding ECHP from the ECHP Server. The SIP server may be designed and constructed to perform one or more of the E-911 or NG-911 call handling actions specified or instructed by the ECHP. The SIP server may be designed and constructed to work in conjunction with an appropriate application server perform the E-911 or NG-911 call handling actions specified via the ECHP.

The SIP server may be designed and constructed to interface to, communicate with or integrate with one or more application servers. The SIP server may use any application specific APIs to communicate or request the application server to perform or execute an application. The SIP server may use any type and form of protocols to communicate or request the application server to perform or execute an application. For example, the SIP server may use a request and response communication protocol, such as HTTP, to send a request to perform an action to an application server and to receive a response from the application server that the action was taken, completed, was successful or had an error.

The SIP server may be designed and constructed to perform one or more actions identified or specified by an ECHP. The SIP server may be designed and constructed to incorporate or include one or more applications that perform respective actions to be executed as identified or specified by an ECHP.

The SIP server may perform several functions such as connecting the terminal 201 to the PSAP 203, obtaining (if required) ECHP rule-set from the LIS and ECHP server 204, executing ECHP rules, and sending ECHP rules or instructions to the application server 205. To the extent the SIP server 202 complies with the national emergency number association's (NENA) i2 and i3 specifications, the SIP server can, for example, assume the role of a call server or an emergency call routing function (ECRF) that is responsible of routing incoming emergency calls to a PSAP appropriate to the caller's location. The NENA i2 and i3 specifications are detailed in: "NENA Interim VoIP Architecture for Enhanced 9-1-1 Services (i2) NENA 08-001, Issue 1 Dec. 6, 2005" and "NENA Detailed Functional and Interface Standards for the NENA i3 Solution NENA 08-003 v1, Jun. 14, 2011," both of which are incorporated herein by reference in their entirety.

In addition to routing incoming emergency calls, the SIP server 202 also obtains ECHPs, rule-sets, or instructions. In one approach, the ECHP is included in the emergency call message 218 (e.g., INVITE message) received from the terminal 201. The ECHP can be included either in the PIDF-LO within the body of the message 218 or in the header of the message. In another approach, the SIP server only receives a reference, in the form of a URL, to the ECHP server 204 from where the ECHP can be obtained. The SIP server 202 uses this URL to send a message 219 to the LIS and ECHP server 204 to receive a message 220 containing the ECHP. In yet another approach, the SIP server 202 receives both the ECHP and the URL to the ECHP server 204, where the ECHP within the emergency call message and the ECHP obtained from the ECHP server 204 may be different.

Once the SIP server 202 obtains the ECHP, the SIP server determines which rules or instructions in the ECHP are to be executed by the SIP server 202, and which rules are to be sent to the application server 205 for execution. For example, the ECHP may include rules or instructions directed specifically for execution by the SIP server 202. The SIP server 202 sends rules or instructions to be executed by the application sever 205 via messages 221. In some instances, the SIP server 202 may process some of the rules or instructions before sending them to the application server 205, while in other instances the processing may be left to the application server 205. The processing may include translating the rules and instructions from the format (e.g., text, XML) received to a format appropriate for communicating (e.g., a remote procedure call with appropriate parameters) with the application server 205. The SIP server 202 may also route the media stream (i.e., audio/video/text) received from the terminal 201 to the application server 205. While FIG. 2A shows only one application server, the SIP server 202 can communicate, and send instructions to, more than one application server based on factors such as the proximity of an application server to the caller, the applications supported by an application server, the availability of an application server, etc. Based on the received ECHP, the SIP server 202 can also insert, delete, or translate one or more PIDF-LO fields; insert, delete, or translate SIP header fields; etc.

The application server 205, for its part, houses applications, or is connected to additional applications severs, for executing rules or instructions received from the SIP server 202. Several application modules 224 are supported by the application server 205. For example, the paging gateway 208 can be employed to send a page to emergency personnel responding to the emergency call. The page can include the phone number of the caller, the location of the caller, etc. A security desk private branch exchange (PBX) 209 with automatic call distribution capability can be employed to direct the media stream of the caller received from the SIP server 202 to an appropriate receiving terminal. A short message service (SMS) gateway 210 can be used to send text messages to communication devices of emergency personnel. A screen pop-up application module 211 can be employed to bring up a pop-up message on the display screens of emergency personnel, which pop-up can include the location information (e.g., civic address, building, room number, etc.) and callback number of the caller. The mail server 212 can be used to send emails to a designated emergency mailing list. An audio/visual alarm application module 213 can be used to activate visual or aural alarms, such as strobe lights, roadside emergency message displays, computer screens, loudspeakers, etc. Particular audio and visual alarms may be selected based upon the parameters such as location, time of day, etc., specified by the ECHP parameters.

One or more application modules may be designed and constructed to provide functionality for and/or processing of rules and/or execution of instructions for any one or more or any combination of the following 1) Emergency Call Monitoring (bridging in a designated phone number with 1 way audio only to listen in).

2) Emergency Call Bridging (bridging in a designated phone number with 2 way audio to participate on the call).

3) Email notification (send an email to a designated distribution list with specific information).

4) Short Message Service (SMS) notification (send a short message service message to a designated distribution list with specific information).

5) Desktop Screen Pop notifications (issue a screen pop on a designated workstation with notification capabilities).

6) Visual alarms (issue a trigger to enable flashing screens, LED display, phone screen display).

7) Audio alarms (issue a trigger to enable sirens, play audio message on a designated phone).

8) Misdial protection (play an audio message to the emergency caller informing them they are about to be connected to emergency services, therefore giving the caller the opportunity to hang-up if they dialed the emergency number by accident; also playing the message in the language configured for/appropriate to the physical location, end user or other signaled attribute).

9) Call Recording (audio recording for the emergency call for legal/investigative/audit purposes if the customer does not have such facilities themselves).

10) Indicate particular PIDF-LO location object handling rules, especially if different from the recommendations in RFC5491 or as previously mandated in other specifications such as NENA i3 to allow flexibility in handling multiple client/server types with differing support of location object ordering and/or PIDF-LO handling rules (e.g. prioritize Geoshape object over civic address, device location object takes precedence over person location object).

11) Indicate particular PIDF-LO location object insertions, deletions or translations based upon the User Agent making the emergency call and/or SIP servers, (e.g. inserting a PIDF-LO object based upon uniquely identifying the User Agent at call time and associating it to a known location in instances where the User Agent does not support PIDF-LO; or concatenating multiple PIDF-LO fields (e.g. BLD, FLR and ROOM into the LOC field) defined in different RFC standards to support handling and interoperability with the emergency call handling network; or matching the PIDF-LO information against a unique location key provided by the emergency call handling network authority and including this key in a particular PIDF-LO field (e.g. ADDCODE) before transmitting to the emergency call handling network), which allows flexibility in handling multiple client/server types and emergency call handling network capabilities with differing support for PIDF-LO field interpretation and representation.

12) Indicate particular SIP header insertions, deletions or translations based upon the User Agent making the emergency call and/or SIP servers, (e.g. inserting a P-Asserted Identity field which contains the emergency callback number if one is not present to ensure correct handling and interoperability with the emergency call handling network), which allows flexibility in handling multiple client/server types with differing support for callback number representation.

13) Indicate callback options not available via FROM/P-AI fields, e.g. fallback callback number (security desk, nursing station on site, administrator to call between dates/times).

14) Test Call (special usage-indication to downstream systems that this call is not an emergency but should be processed like an emergency call for the purposes of testing call, location and callback number conveyance, e.g. when installing a new/upgraded voice system at an enterprise before the system goes live, or modifying an existing live voice system or the underlying network which may effect emergency call processing).

15) Indicate Routing Rules dependent on location or other rules (e.g. force calls to go to an Emergency Response Call Center in times of natural disaster or when routing errors have been detected, direct call delivery to security desk for secure areas where the enterprise may have special dispensation for emergency call handling).

The PSAP 203 is the corresponding public safety answering point responsible for answering or that answers emergency calls made by the caller at terminal 201. Once the SIP server 202 connects the terminal 201 to the PSAP 203, media streams (e.g., audio streams, video streams, and text) can be exchanged between the terminal 201 and the PSAP 203. The PSAP 203 may include a terminal 215 and a computing device 214. The terminal 215 can be a VOIP enabled phone for reproducing received audio streams and generating audio streams to be sent to the caller at the terminal 201. The computing device 214 can reproduce video streams and text received from the caller at the terminal 201 and can also display the location of the caller on a map. The computing device 214 can also be used by the emergency personnel to enter additional data and information received while communicating with the caller during the emergency call. The additional data and information can be transmitted to emergency service responders such as the police, the fire department, emergency medical technicians, and paramedics.

Figure 2B:
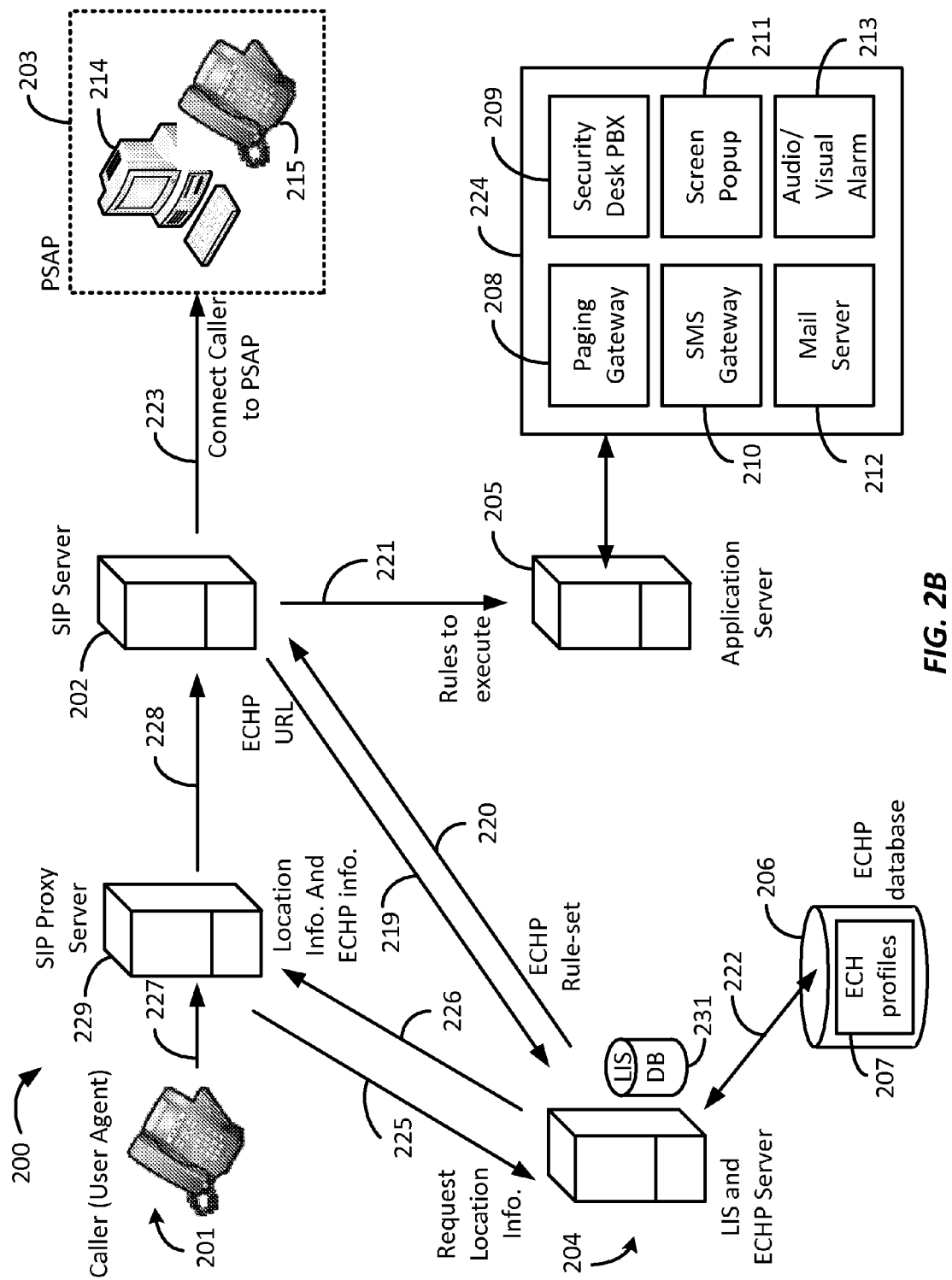
FIG. 2B is a block diagram of another embodiment of a system showing the exchange of ECHP information, in which system a proxy server is used to obtain the ECHP information.

FIG. 2B shows an example embodiment of the system 200 where an SIP proxy server is used to obtain the location information and ECHP information from the LIS and ECHP server on behalf of the terminal. In some embodiments, the terminal 201 is incapable, unable, or not configured to obtain information from the LIS and ECHP server 204. The terminal 201 may still be capable of generating an emergency call message (e.g., the SIP INITIATE message), however, instead of sending the message to the SIP server 202 (as was shown in the example of FIG. 2A), the message is sent to the SIP proxy server 229. The SIP proxy server 229, like proxy servers in general, acts as an intermediary between the terminal 201 and the SIP server 202. The SIP proxy server 229 modifies the emergency call message 227 received from the terminal 201 by adding location and ECHP information obtained from the LIS and ECHP server 204 on behalf of the terminal 201, and forwards the modified emergency call message 228 to the SIP server 202. Any responses received from the SIP server 202 are forwarded to the terminal 201. Once an emergency call has been established, the SIP proxy server 229 merely forwards the media streams in both directions.

Figure 2C:
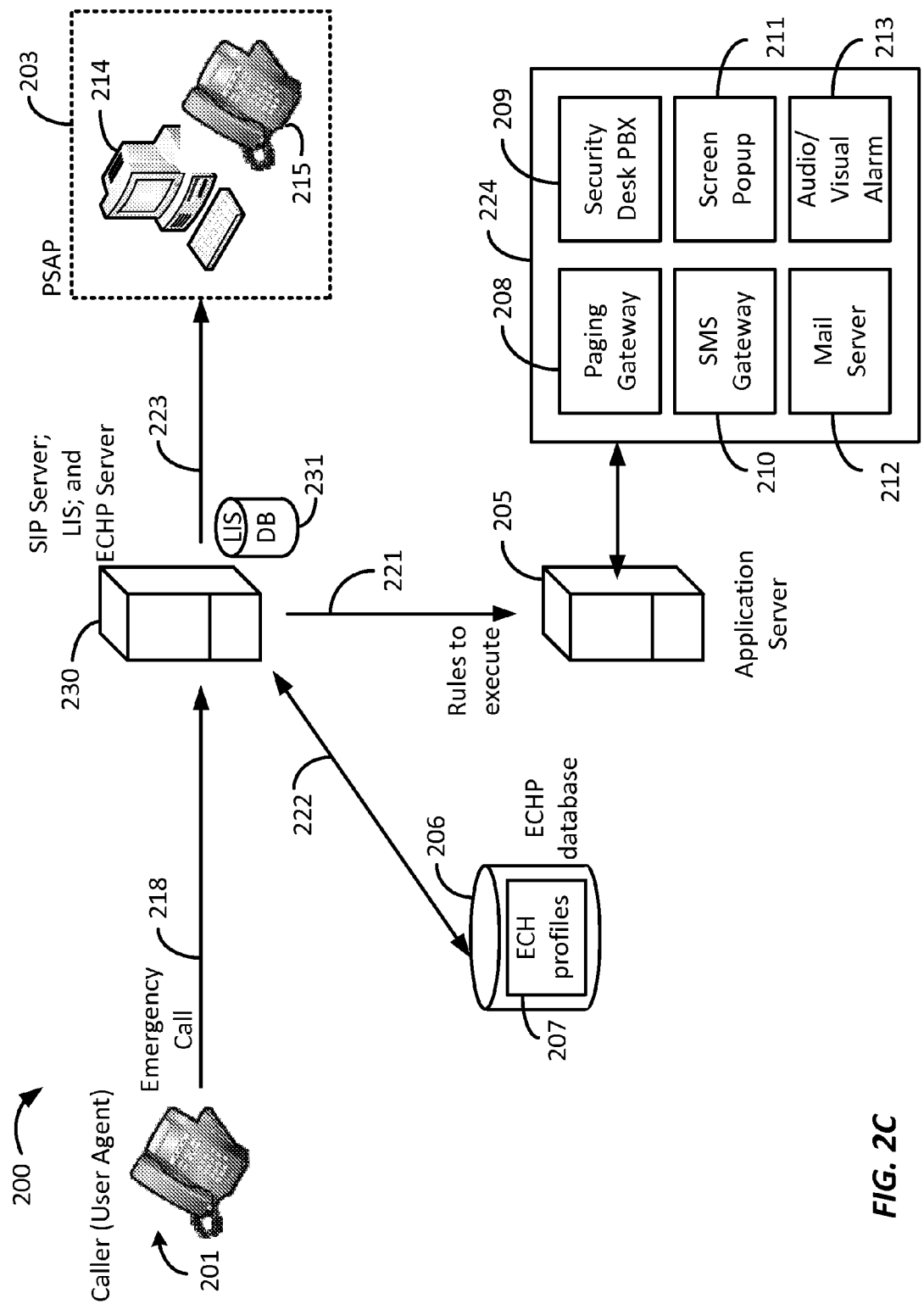
FIG. 2C is a block diagram of another embodiment of a system showing the exchange of ECHP information, in which system the location information server, the ECHP server, and the SIP server are co-located.

The SIP proxy server 229 obtains the location information and the ECHP information from the LIS and ECHP server 204 in a manner similar to the one carried out by the terminal 201 in FIG. 2A. As such, the SIP proxy server 229 can use the same protocol (e.g., HELD) to send requests 225 to the LIS and ECHP server 204 and receive responses 226 with location information and ECHP information. Although in many embodiments, the location is provided in the PIDF-LO format, in some embodiments, the SIP proxy server 229 may use a unique identifier to index into or to the ECPH. For example, in some embodiments, the SIP proxy server 229 includes a unique identifier corresponding to the terminal 201 in the request 225 message, which unique identifier is used by the LIS and ECHP server to access location and ECHP information corresponding to the terminal 201 from the LIS database 231 and the ECHP database 206. The unique identifier can be the phone number of the terminal 201, the IP address of the terminal 201, or an identifier assigned to the terminal 201 by the VOIP service provider. For example, in some embodiments, the IP address of the terminal 201 can be extracted by the SIP proxy server 229 from the emergency call message—SIP INITIATE message—received from the terminal 201. The IP address of the terminal 201 normally appears in the "FROM" field of the header of the SIP INITIATE message. Additional information on obtaining location information by an entity other than the terminal 201 from a LIS server can be found in "draft-ietf-geopriv-held-identity-extensions-06," available on the IETF website, and is incorporated herein by reference in its entirety. FIG. 2C shows an example embodiment in which the SIP server, the LIS server, and the ECHP server are co-located. Co-location can mean that the SIP server, LIS server, and the ECHP server have the same geographical location (such as, the same room, server rack, server blade, etc.), yet have different network addresses. So the terminal 201, or any other client, would have to use different network addresses to send request messages to the SIP, LIS, and ECHP servers. For example, the terminal 201 would have to send a message requesting location information (e.g., HELD message) to one network address associated with the LIS server, while sending a message to initiate a call (e.g., INVITE message) to a different network address.

However, co-location may also mean that the SIP, LIS, and ECHP servers can be accessed using the same network address, albeit, with different port numbers. For example, the terminal 201 would have to send location information request message (to the LIS and ECHP server), as well as the call initiation message (to the SIP server) to the same network address, but to different ports assigned to the LIS and ECHP server and the SIP server.

Figure 2D:
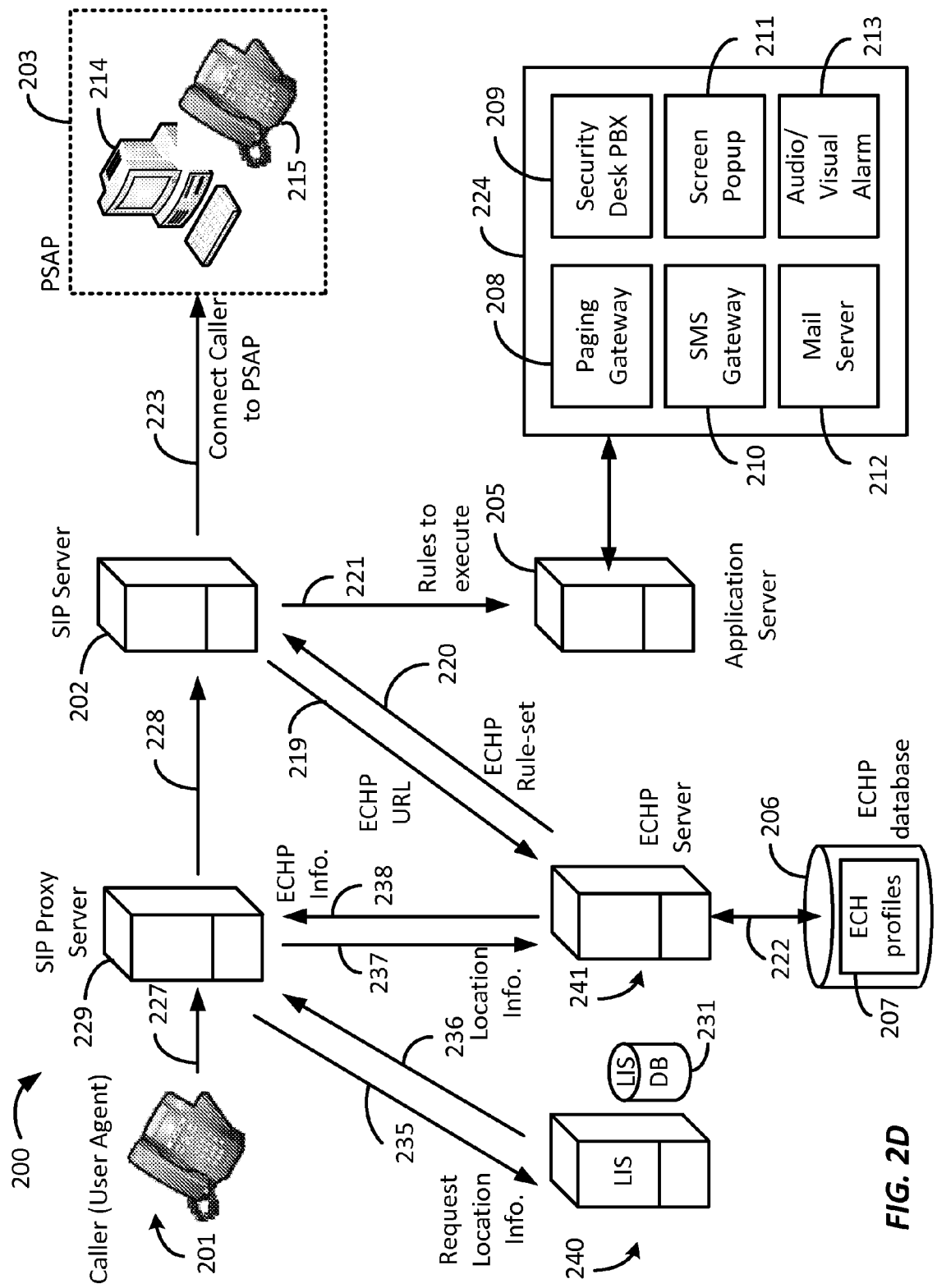
FIG. 2D is a block diagram of another embodiment of a system showing the exchange of ECHP information, in which system the proxy server is used to obtain ECHP information from the ECHP server that is located separately from the location information server.

The embodiment of the system shown in FIG. 2D is similar to the example shown in FIG. 2B in that a proxy server is used to obtain location information associated with the terminal from the LIS server on behalf of the terminal. However, while the LIS server and the ECHP server 204 of FIG. 2B were co-located, in FIG. 2D the LIS server and the ECHP server are separate. The SIP proxy server 229 sends messages 235 to request location information from the LIS server 240 and sends messages 237 to request ECHP information from the ECHP server 241. In response, the LIS server replies 236 with the requested location information of the terminal 201 while the ECHP server 241 replies 238 with ECHP information associated with the emergency call. In some embodiments, the SIP proxy server 229 obtains the location information and the ECHP information a priori to receiving the emergency call. But, the SIP proxy server 229 may also obtain this information only after it receives an emergency call initiation message from the terminal 201.

When the terminal 201 initiates an emergency call, the terminal sends a call initiation message 227 to the SIP proxy server 229, which includes the previously obtained location information and ECHP information within the call initiation message and sends the message 228 to the SIP sever 202. The SIP server 202, as discussed above, then connects the terminal 201 to the PSAP 203 using the location information and communicates with the application server 205 to execute rules or instructions detailed in the ECHP.

Figure 2E:
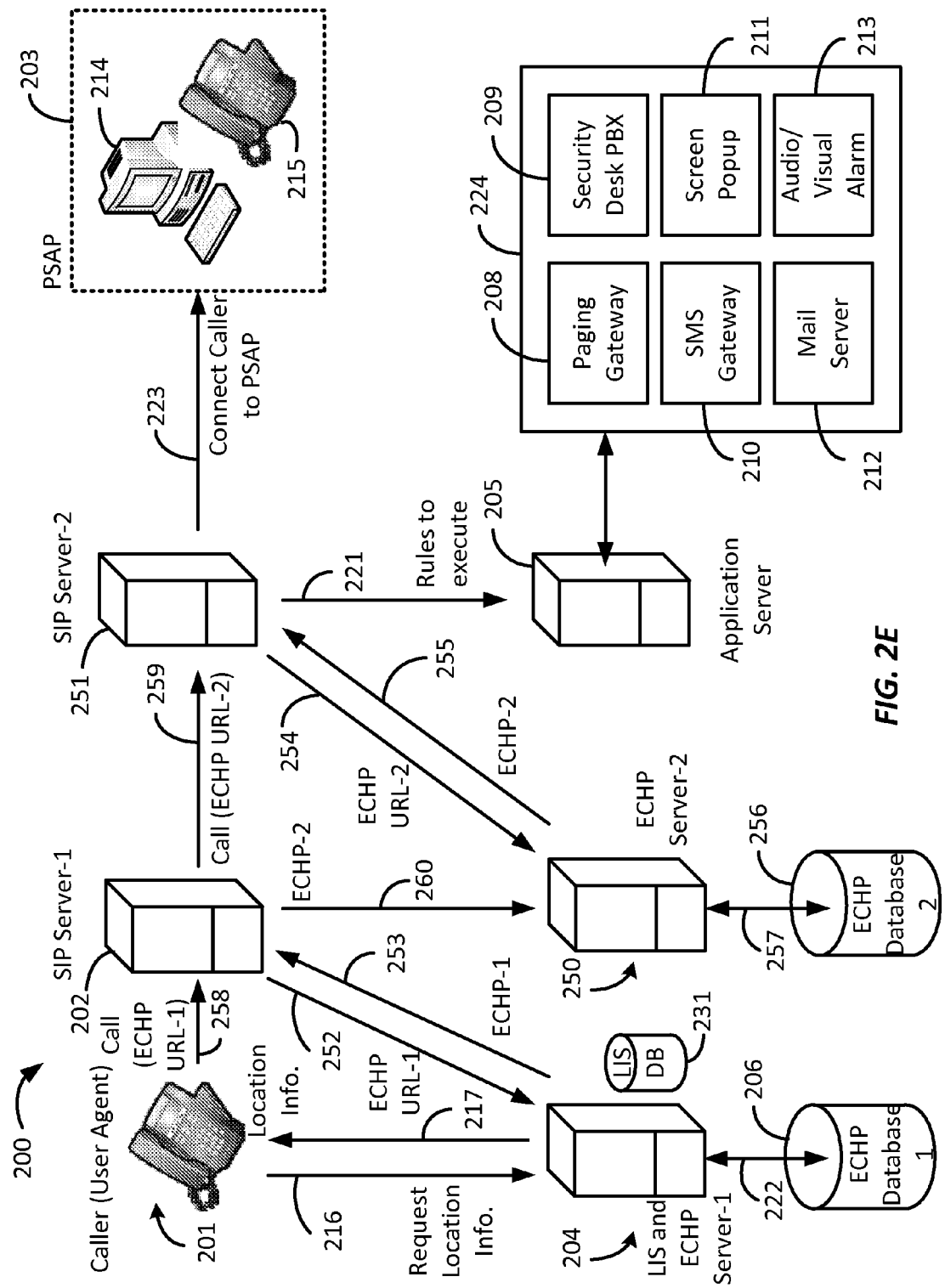
FIG. 2E is a block diagram of another embodiment of a system showing the exchange of ECHP information, in which system two SIP servers obtain ECHP information from two separate ECHP servers.

FIG. 2E shows an example embodiment in which more than one SIP server and more than one ECHP database are employed to process ECHP for an emergency call. Similar to the example embodiment shown in FIG. 2A, FIG. 2E also includes an SIP server—SIP server-1 202—and a LIS and ECHP server 204. However, the example of FIG. 2E additionally includes a second SIP server—SIP server-2 251—and a second ECHP server—ECHP server-2 250.

The SIP server-1 202, upon receiving a request 258 for initiating an emergency call, communicates with the LIS and ECHP server-1 204 using the received ECHP URL-1. In response 253, the LIS and ECHP server-1 204 returns an ECHP-1 253. One portion of the ECHP-1 253 includes a rule-set ECHP-2 along with a URL of the ECHP server-2 250. The ECHP-1 253 also includes rules instructing the SIP server-1 202 to store the ECHP-2 to the ECHP database-2 256 and to send the URL (ECHP URL-2) of the ECHP server-2 250 to the SIP server-2 251. For storing the ECHP-2 to the ECHP database-2 256, the SIP server-1 202 communicates with the ECHP server-2 250, instructing the server to store the ECHP-2 to the ECHP database-2 256 such that the ECHP-2 can be retrieved using the ECHP URL-2. The SIP server-1 202 also forwards the emergency call initiation message to the SIP server-2 251, which message also includes the ECHP URL-2. While not explicitly shown in FIG. 2E, the SIP server-1 202 can also communicate with the application server 205 for executing any rules that the SIP server-1 202 receives in the ECHP-1 from the ECHP database-1 206.

The ECHP server-2 250 and the ECHP database-2 256 may be functionally similar to the LIS and ECHP server-1 204 and the ECHP database-1 206, respectively, except that the ECHP server-2 250 may not include LIS functionality. The ECHP server-2 250 communicates with the ECHP database-2 256 over communication link 257. The ECHP server-2 250 responds to requests for access to the ECHP database-2 256. For example, the ECHP server-2 250 responds to the request 260 received from the SIP server-1 202 for storing the ECHP-2 to the ECHP database-2 256. The ECHP server-2 250 also responds 255 to a request 254 for retrieving the ECHP-2 from the SIP server-2 251, which request 254 is received in the form of the ECHP URL-2.

The SIP server-2 extracts the ECHP URL-2 included in the emergency call initiation message forwarded by the SIP server-1 202 and uses the ECHP URL-2 to communicate 254 with the ECHP server-2 250. Upon receiving the ECHP-2 from the ECHP server-2 250, the SIP server-2 executes the rule-set included in the ECHP-2. This can include executing any instructions that can be executed at the SIP server-2 and sending other instructions for execution to the application server 205. The SIP server-2 also routes the emergency call for connecting the terminal 201 to the appropriate PSAP 203.

It should be noted that the example of FIG. 2E may be modified to use only one ECHP database. In such cases, the ECHP-1 received by the SIP server-1 202 would include the instructions to store the ECHP-2 to the LIS and ECHP database 206, and the ECHP URL-2, instead of directing the SIP server-2 251 to the ECHP server-2 250, would direct the SIP server-2 251 to the LIS and ECHP server-1 204.

In one example, the SIP server-2 251 may obtain ECHP independently of any ECHP information received from the SIP server-1 202. For example, the SIP server-2 251 may obtain ECHP-2 based not on the ECHP URL2 received from the SIP server-1 202 but instead on other attributes of the emergency call initiation message received by the SIP server-2 251. The other attributes may include the time of call, the identity of the caller, etc. Using these attributes, the SIP server-2 251 may communicate with another ECHP server to request ECHP information corresponding to the attributes. In response, the SIP server-2 251 can receive pre-established ECHP rules or instructions, which may be executed by the SIP server-2 251.

Figure 2F:
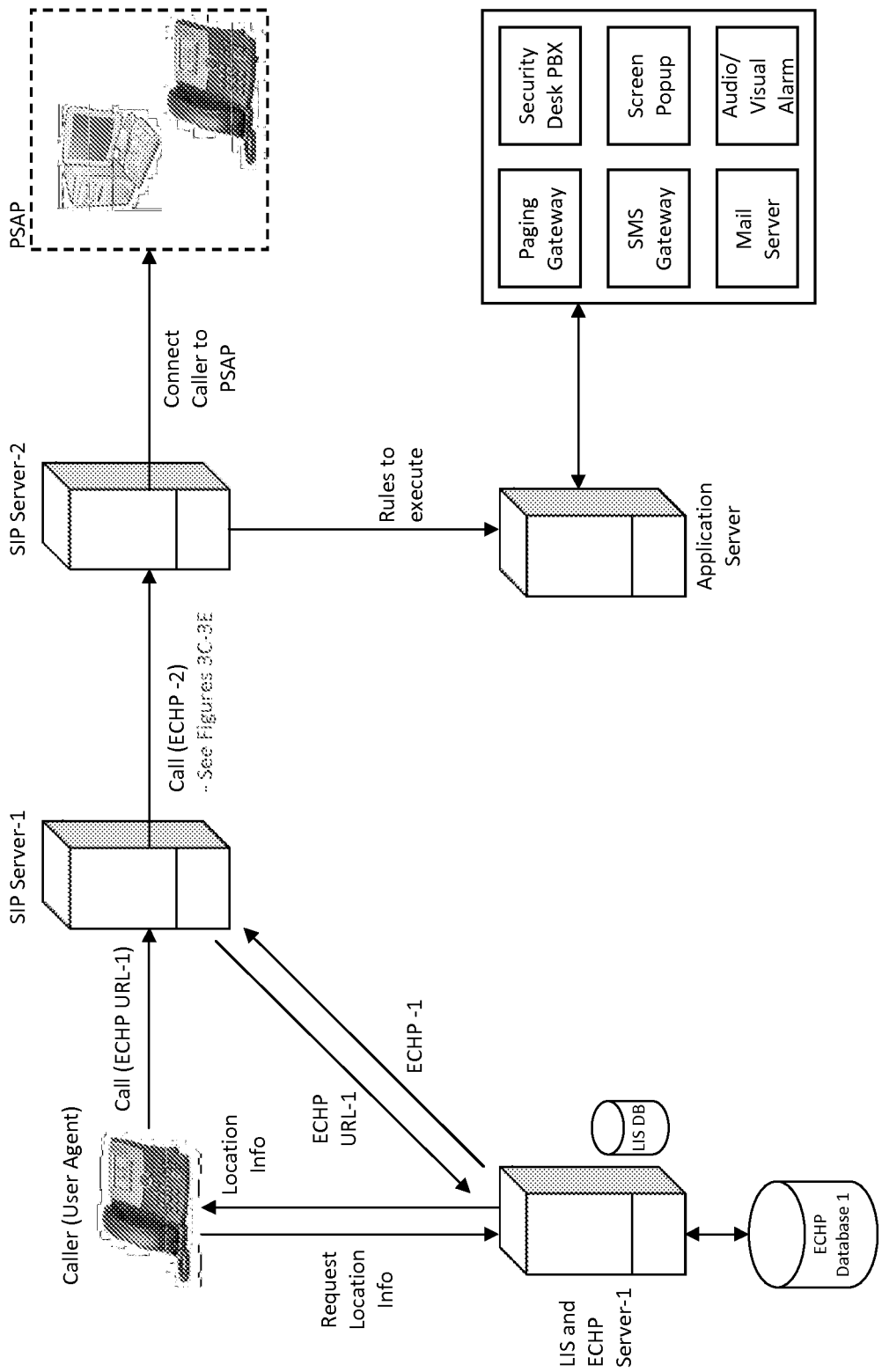
FIG. 2F is a block diagram of another embodiment of FIG. 2E with a forwarded rule set.
Figure 2G:
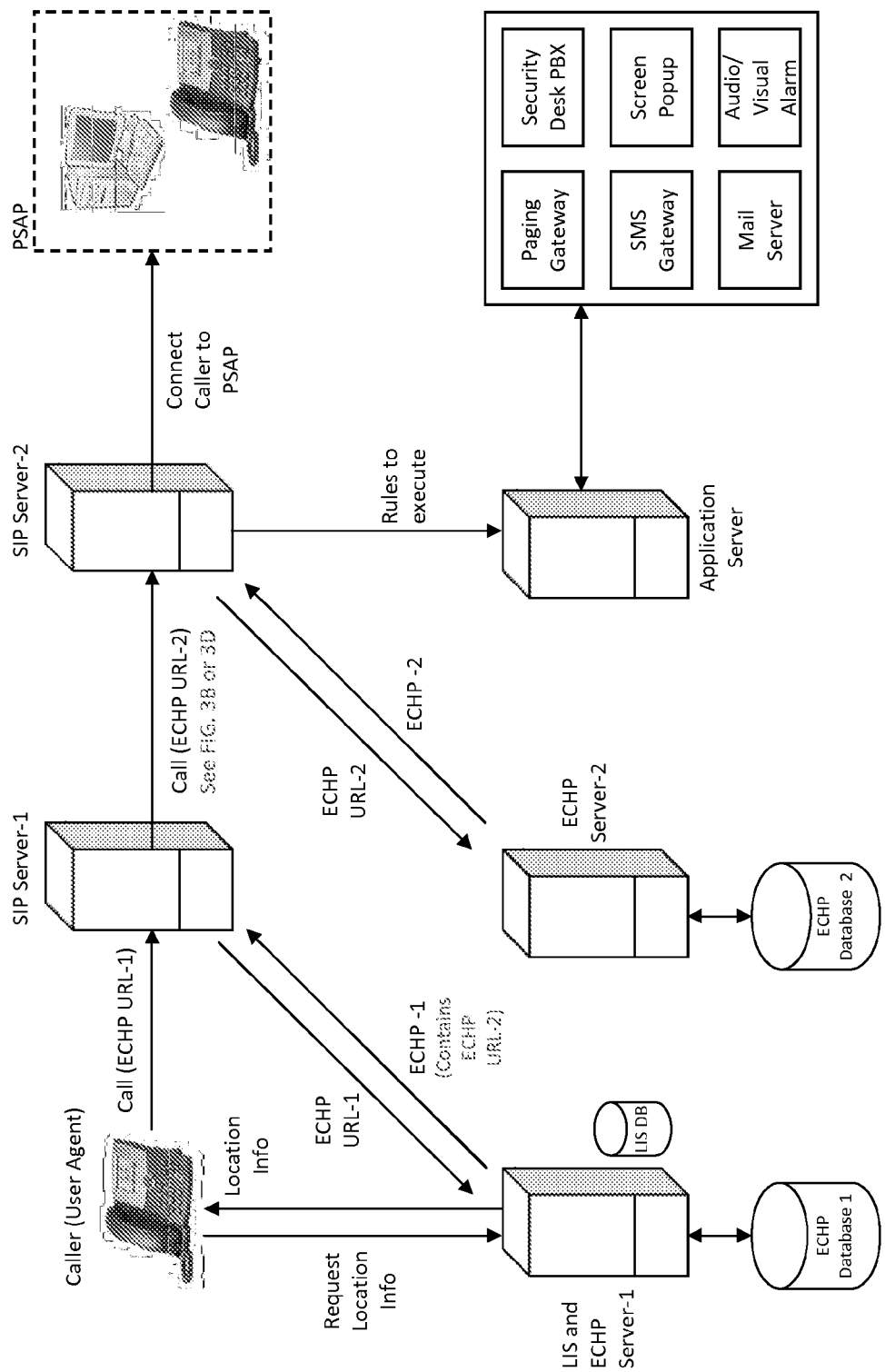
FIG. 2G is a block diagram of another embodiment of FIG. 2E with separated ECHP administration.
Figure 2H:
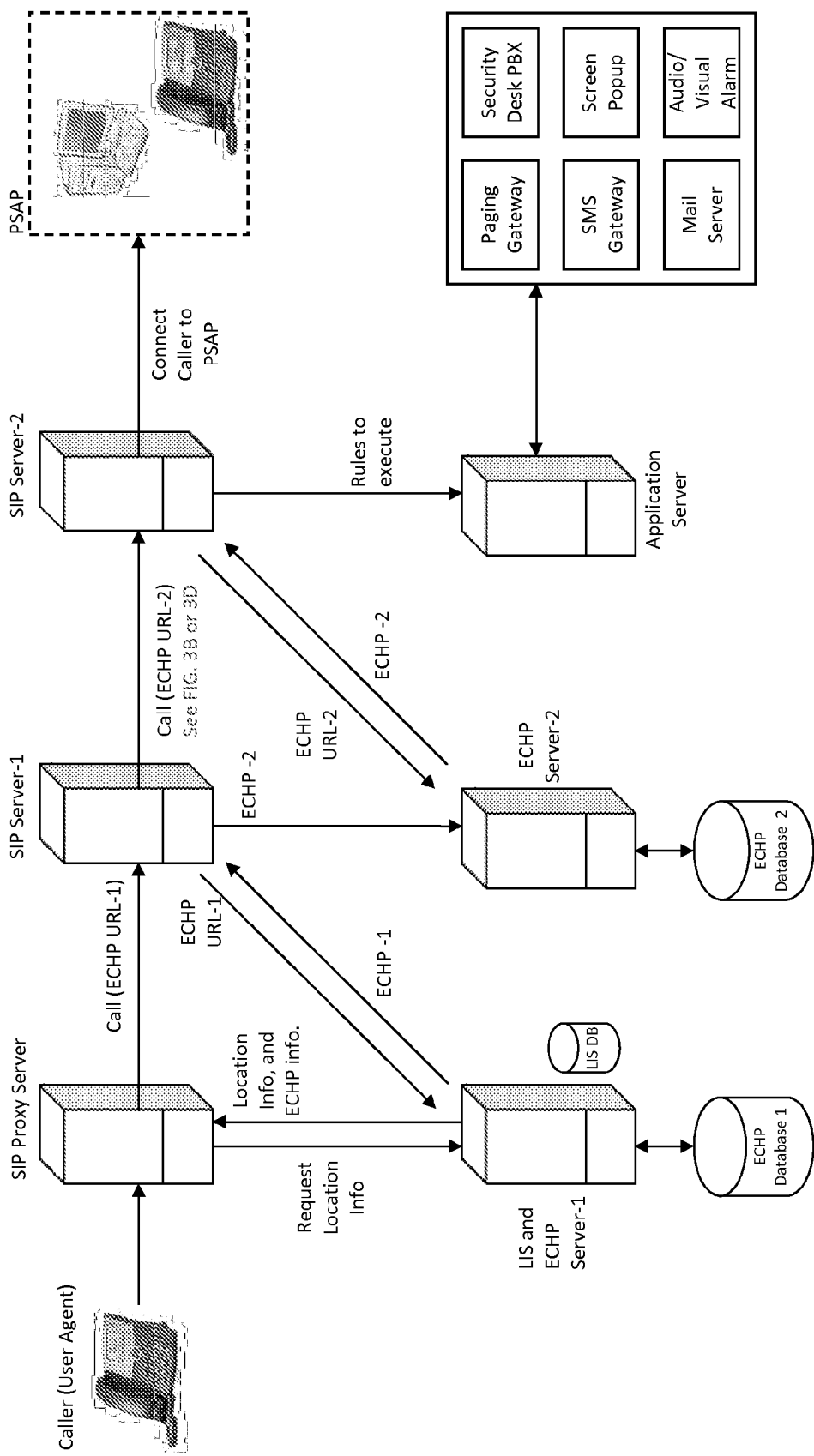
FIG. 2H is a block diagram of another embodiment of FIG. 2E with a non-location/non-ECHP aware user agent.

Referring now to FIGS. 2F-2H, the configurability and flexibility of the present solution provides for implementation via a multitude of different deployments and embodiments. FIG. 2F illustrates a variation of FIG. 2E in which the rule set is forwarded. FIG. 2G illustrates another variation of FIG. 2E with separated ECHP administration. FIG. 2H illustrates yet another variation of FIG. 2E with a non-location/non-ECHP aware user agent.

FIGS. 2F-2H may be explained in view of the aspects of FIG. 2E. In some aspects, FIG. 2E may be deployed with a full ECHP ruleset contained in ECHP Database 1, and is composed on 2 groups (ECHP1 and ECHP2). FIG. 2E may also further deploy and configure that SIP Server-1 such that SIP Server-1 can execute ECHP1 ruleset, but provision the ECHP2 ruleset in ECHP Database 2 via ECHP Server-2, and provide a reference to the ruleset (ECHP URL-2) in the call SIP Server-1 forwards to SIP Server-2.

Referring to FIG. 2F, in this case, the SIP Server-1 executes the ECHP-1 ruleset, and then includes the ECHP-2 ruleset with the call SIP Server-1 forwards to SIP Server-2. The SIP Server-1 forwards or passes the rules in a manner which can be understood by SIP Server-2, and that the rules themselves can be processed (at least in part if forwarding to yet another SIP Server) directly by SIP Server-2, and/or by a connected application server. FIG. 2F is also an example whereby SIP Server-1 and SIP Server-2 have different capabilities, but the protocol for passing ruleset information (e.g. PIDF-LO extensions) and the rules themselves are previously understood as compatible with SIP Server-2 (and any connected application server(s)). Both servers may or may not be administered by different organizations.

Now referring to FIG. 2G in view of aspects of FIG. 2E. In some aspects of FIG. 2E, ECHP-1 contains a reference to ECHP-2 (ECHP URL-2) and not the actual ruleset. Therefore, SIP Server-1 does not have to distinguish between the rules (or rulesets), nor does SIP Server-1 have to provision the ECHP-2 ruleset in ECHP Database 2 via ECHP Server-2, and obtain a reference to it (ECHP URL-2). Now FIG. 2G is an example whereby SIP Server-1 and SIP Server-2 are administered separately (e.g. by two different organizations), and ECHP capability has been contracted from the SIP Server-2 organization by the SIP Server-1 organization. The SIP Server-1 organization does not have to have all the specific rules contained in ECHP-2, but they understand what rules will be applied if they use the correct reference (ECHP URL-2).

Now referring to FIG. 2H in view of aspects of FIG. 2E. In some aspects, FIG. 2E may assume the User Agent is location- and ECHP-aware. FIGS. 2B and 2D show the scenario where a SIP Proxy Server references a location and a ECHP based on calling information from the User Agent. FIG. 2H is a combination of the non-location- and ECHP-aware caller agent concept and deployment scenario from FIGS. 2B and 2D with the multiple SIP Server concept and scenario deployment of FIG. 2E. FIG. 2H can also be combined with the FIGS. 2F and 2G scenarios describes above. Furthermore, a deployment may combine any of the aspects of FIGS. 2E-2H to provide a solution in view of the systems and methods described herein.

C. Emergency Call Handling Profile

Figure 3A:
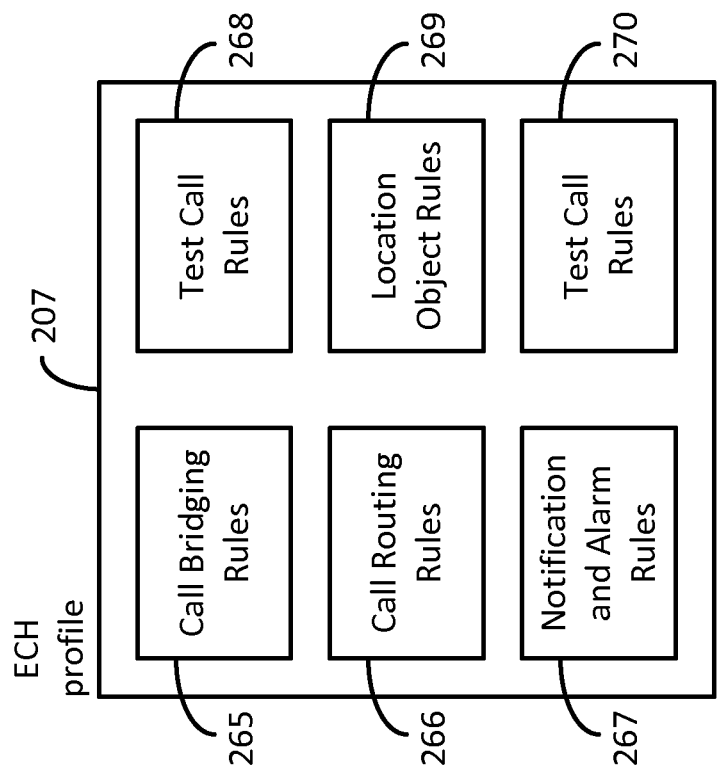
FIG. 3A shows various types of rule-sets that can be included in the ECHP.

Discussion now turns to various examples of rules that can be specified by the ECHP. FIG. 3A illustrates an ECHP 207 which may include one or more rules that provide, specific or identify call handling actions. ECHPs may support a variety of different rules, such as call bridging rules 265, call routing rules 266, notification and alarm rules 267, test call rules 268, location object rules 269, and SIP rules 270.

The ECHP 207 may comprise any type and form of object, data structure, file, document or data stored to storage or memory, such in a database of the ECHP server. In some embodiments, the ECHP may comprise an XML document. In some embodiments, the ECHP may comprise a document in a mark-up language. The ECHP server may be designed and constructed to obtain data from an ECHP database and generate the ECHP in a desired, requested or predetermined format, such as XML, HTML, etc.

The ECHP may define or specific rules for processing or handling of a call, such has an E-911 or NG-911 call or VOIP call. The ECHP may include one or more rule sets. A rule set may comprise of one or more rules. A rule may comprise one or more instructions to perform one or more actions, such as an action to be performed by the SIP server or an application server. A rule may comprise one or more parameters that defines, configures or sets a condition or value for operation or performance of the action specified by the instruction. A parameter may specify a condition, value or options for the instruction. The parameter may specify a condition, an option or data value to be passed with or included with the instruction to perform an action communicated to an application or SIP server or executed by an application or the SIP server.

The instructions and/or parameters of the rules may comprise logical and conditional expressions, constructs and/or language. The rules may be applied, evaluated or processed responsive to any attributes of the call or entities associated with the call, such as the SIP server or application server. A rule's instructions and parameters may comprise conditional logic based on any attributes related to the call, such as location and language of the caller, the type of device or user agent, the date and time of the call and the destination of the call. A rule's instruction and parameters may comprise an expression that is evaluated or applied to the attributes of the call and/or to content one or more network packet(s) of the call. A rule's instruction and parameters may apply logic or evaluate expressions related to attributes of any devices in the path of the call or to any server, system or application connected to processing of the call.

Referring now to different types of rules, the call bridging rules 265 can include rules that specify bridging the emergency call to entities in addition to the PSAP (as shown in FIGS. 2A-2E). These rules may specify instructions for bridging and parameters for performing the bridging. For example, the instruction may specify to make a bridge and a parameter may specify whether to make a one-way or two-way bridge. In one example, the emergency call may also be bridged to a local security office of the caller's building. The bridging can be a 1-way audio bridging in which the local security office would only be able to listen to the audio between the caller and the emergency responder at the PSAP. In some embodiments, the bridging can also be 2-way bridging in which the local security office can also participate in the emergency call. Of course, if multiple entities are bridged, the rules can specify the entities that are to be bridged with 1-way audio and the ones that are to be bridged with 2-way audio.

The call bridging rules 265 may also specify rules for recording any audio/video streams resulting from the emergency call for legal, investigative, or auditing purposes.

The call routing rules 266 can include rules that specify where the emergency call is to be routed, such as based on the location of the terminal, the time of the day, the weather, etc. For example, the rules can specify to route the call to an emergency response call center in times of a natural disaster. In another example, if a routing error is detected, the rules can specify to route the call to a security desk with emergency call handling capability. In yet another example, if a misdial is detected, the rules 266 can specify to route the call to a answering service that plays a message to the caller informing him/her that he/she is about to be connected to the emergency response service, and that if the call was initiated in error, the caller should hang up. The routing of the misdialed call may also be based on a language of the message. The language may be selected by the caller or the language may be automatically selected for the caller based on, caller ID, the caller's location, etc.

The notification and alarm rules 267 may comprise rules for one or more alarms to be set off and notification to be sent for the emergency call. The notification and alarm rule may comprise an instruction to specify the notification or alarm and the parameter(s) may specify a characteristic of the notification or alarm. These rules may specify a visual alarm such as an instruction and parameter that issues a trigger to enable flashing screens, LED display, phone screen display, etc. These rules may specify an audio alarm such as an instruction and a parameter to issue a trigger to enable sirens, play audio message on a designated phone, etc. For example, the rules can specify triggering strobe lights; flashing screens with emergency messages on roadside emergency message displays, phones, etc.; and pop-up messages on computers, emergency display monitors, etc. Furthermore, the rules can specify triggering aural alarms such as sirens, pagers, and phones. The notification and alarm rules 267 can also specify sending email messages and/or short message service (SMS) notifications with emergency information to designated distribution lists.

The notification and alarm rules may comprise instruction(s) and parameter(s) to set off alarms and send notifications in response to a misdialed emergency call.

The test call rules 268 include specific instructions that inform various systems involved in the processing of an emergency call that the emergency call should be processed as a test call. For example, the test call rules can be assigned to emergency calls that are used for testing newly installed or repaired equipment.

The location object rules 269 specify various instructions related to the location object (e.g., the PIDF-LO introduced above). For example, the location object rules 269 can indicate which one of the civic address or the geo-spatial address, both of which appear in the PIDF-LO, is to be given priority. The location object rules 269 can also indicate that the device location, if different from the location of the caller on record, is to be given precedence over caller location. In another example, the location object rules 269 can indicate particular PIDF-LO object insertions, deletions, or translation based on the terminal or the terminal making the call and the type of SIP servers processing the calls. For instance, inserting a PIDF-LO in the call initiation message on behalf of a terminal that does not support PIDF-LO; or concatenating multiple PIDF-LO fields (e.g., building (BLD), floor (FLR), room (RM), etc.) defined in various E-911 and NG-911 standards to support handling and interoperability with the emergency call handling network. In yet another example, the location object rules 269 can specify including a location key that any entity (e.g., an SIP server) can use to determine and translate non-standard PIDF-LO fields within the PIDF-LO objects. The location key can be a URL to a server that provides rules and translations for non-standard PIDF-LO fields. This aspect provides flexibility in handling multiple client/server types and emergency call handling network capabilities with differing support of PIDF-LO field interpretations.

The SIP rules 270 may comprise instructions(s) and parameter(s) that specify particular SIP header insertions, deletions, and translations to be carried out by the SIP servers (e.g., SIP server 202 in FIG. 2A). For example, the rules may specify inserting a P-Asserted Identity field, which contains an emergency call-back number. In instances where the SIP server does not include the capability to support FROM/P-Asserted Identity fields in the SIP header, the SIP rules may specify including default call-back number fields along with field translation information.

Figure 3B:
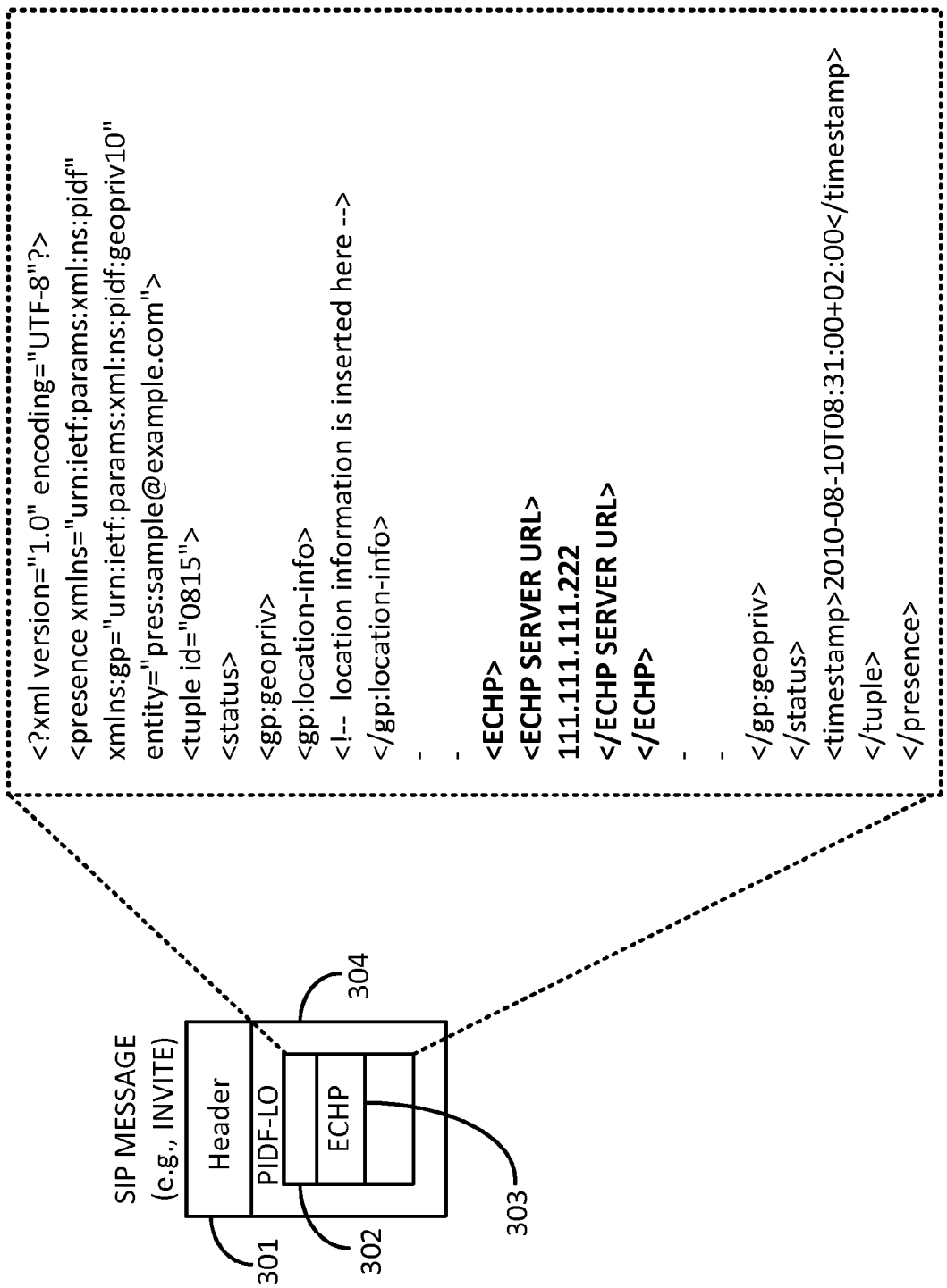
FIG. 3B shows an example of an ECHP server link included within a PIDF-LO file.
Figure 3C:
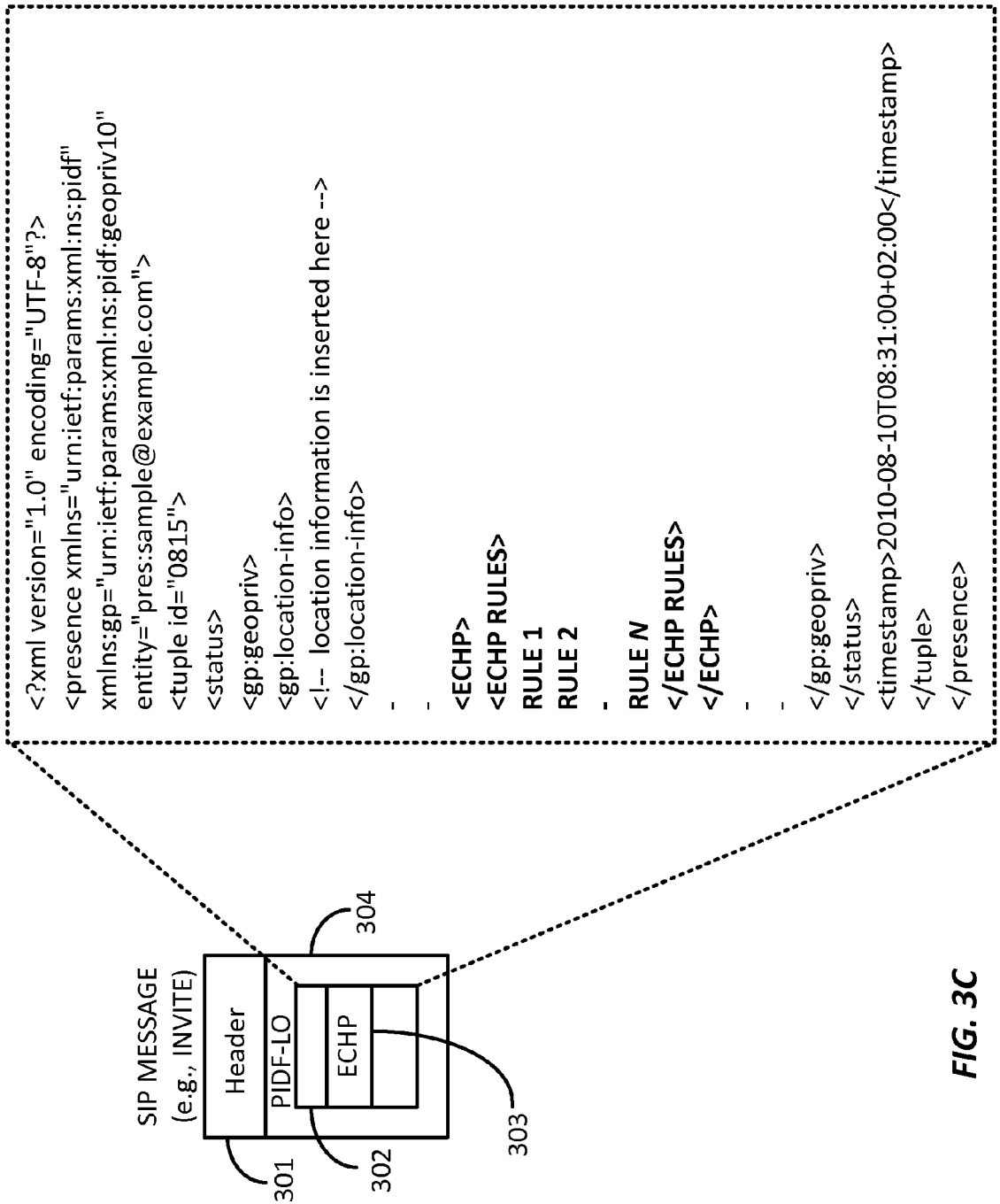
FIG. 3C shows an example of ECHP rules included within the PIDF-LO file.

Having discussed the various types of rules included in ECHPs, the discussion now turns to examples that illustrate how the ECHP information is conveyed during a call. As discussed above with reference to FIGS. 2A-2E, the ECHP information (whether in the form of an ECHP rule-set or in the form of a link) can be inserted, for example, within the PIDF-LO object or the SIP header. FIGS. 3B and 3C illustrate examples in which the ECHP information is included in the PIDF-LO object, while FIGS. 3D and 3E illustrate examples in which the ECHP information is included in the SIP header.

Turning to FIG. 3B, an SIP message 301 is shown that includes a header 301 and a body 304. The body includes a PIDF-LO 302, which, in turn, includes ECHP information 303. The ECHP information is in the form of a URL to an ECHP server that can provide additional ECHP information. FIG. 3B also shows a portion of the PIDF-LO and the ECHP information included therein. The ECHP information is enclosed within tags <ECHP> and </ECHP>. The <ECHP SERVER URL> and </ECHP SERVER URL> tags indicate that the ECHP information between the tags is a URL to the ECHP server. Although only a single URL is shown in FIG. 3B, the ECHP information may include more than one URL to the same or separate ECHP servers. Moreover, the URL can include additional query strings concatenated to the URL, which allow the receiving ECHP server to access the requested ECHP rule-set. It is understood that the tags shown in FIG. 3B are merely examples, and that any other nomenclature can be employed to indicate the presence and location of ECHP information within the PIDF-LO 302.

While FIG. 3B shows an example embodiment in which the ECHP information includes a URL to an ECHP server, the example embodiment in FIG. 3C shows that the ECHP information 303 includes specific rules. The ECHP rules: RULE 1, RULE 2, . . . , RULE N are enclosed within the tags <ECHP RULES> and </ECHP RULES>. These tags indicate that the information included within the tags are ECHP rules. It should be noted that the ECHP information 303 can simultaneously include both URLs to ECHP servers and specific rules.

Figure 3D:
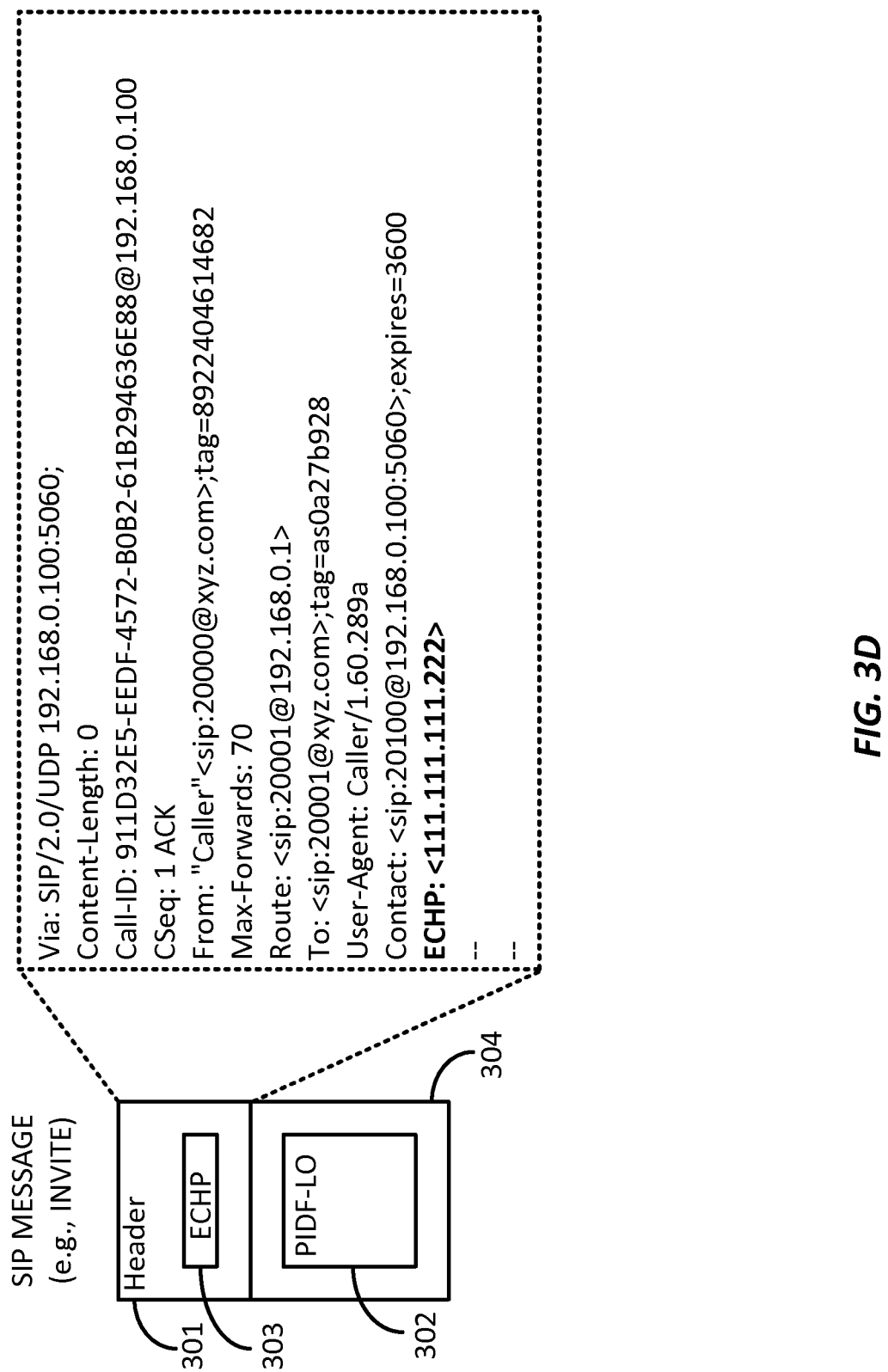
FIG. 3D shows an example of an ECHP server link included within the header of an SIP message.
Figure 3E:
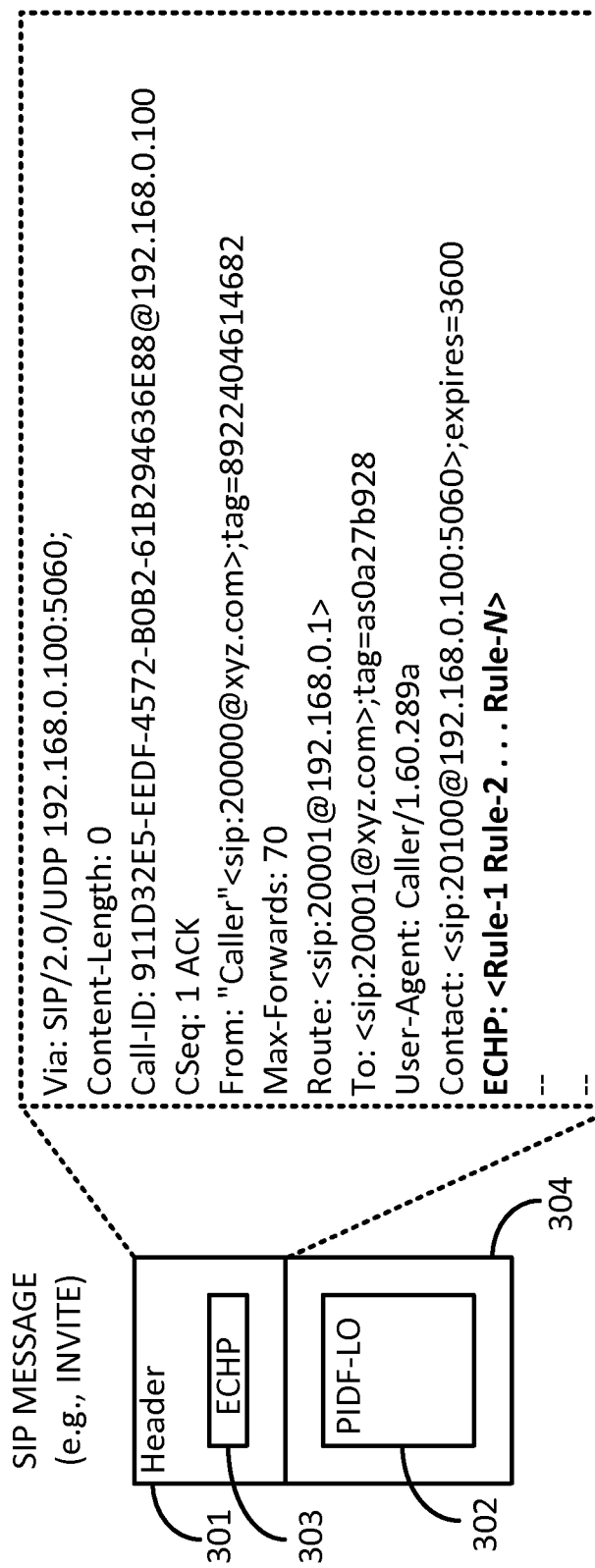
FIG. 3E shows an example of ECHP rules included within the header of an SIP message.

FIG. 3D shows an example embodiment in which ECHP information 303 is included in the header 301 instead of the body 304 of the message. The portion of the FIG. 3D within the dotted rectangle shows examples of various header fields that may appear in a typical SIP message header in addition to the ECHP field. The "ECHP:" field indicates that the information following the field includes ECHP information. The ECHP information includes a URL to an ECHP server from which ECHP rules can be obtained. As mentioned above, the URL can include additional query strings concatenated to the URL, which allow the receiving ECHP server to access for the requested ECHP rule-set. Moreover, the nomenclature for naming the ECHP tag may vary.

FIG. 3E also shows an example embodiment in which the ECHP information is included in the header 301 of the message, however, the ECHP information is in the form of specific rules. The rules: Rule-1, Rule-2, . . . , Rule-N are explicitly listed following the "ECHP:" field. It should be noted that the header 301 can simultaneously include both URLs to ECHP servers and specific rules. It should also be noted that the ECHP information (whether URLs or specific rules) can be included in both the header 301 and the body 304 of the message.

D. Example Operations of the SIP Server

Figure 4:
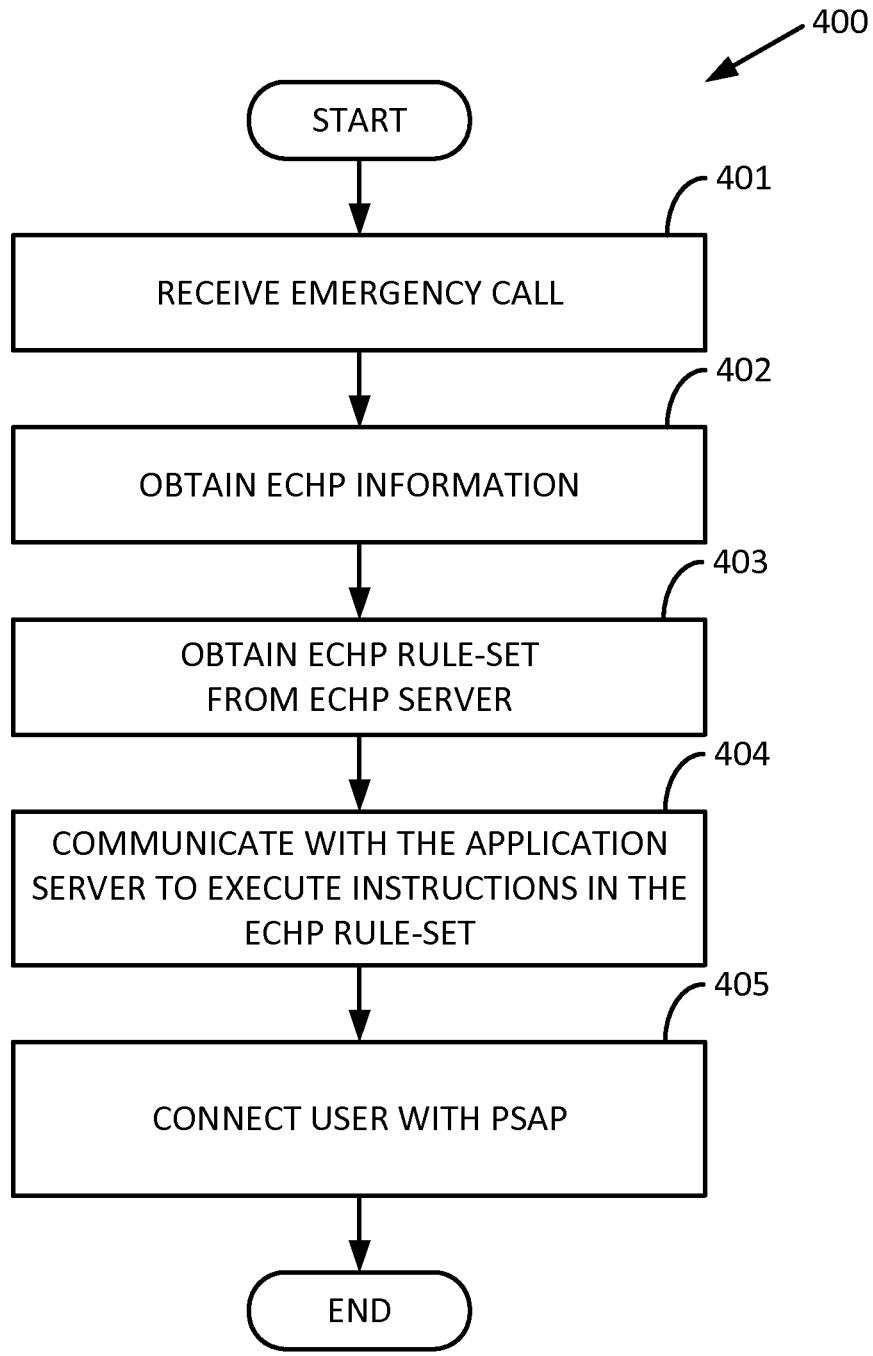
FIG. 4 shows a flowchart illustrating various actions performed by the SIP server for exchanging ECHP information.

Discussion now turns to FIG. 4, which shows an embodiment of steps of a method performed by a SIP server for handling an emergency call. In brief overview, at step 401, a SIP server receives a E-911/NG-911 call. At step 402, the SIP server obtains ECHP information. At step 406 the SIP server determines whether the ECHP information includes a link to an ECHP server. At step 403, the ECH profile is ECHP rule-set or instructions are obtained from the ECHP server. At step 404, instructions from the rule set are executed, such as by the SIP server or the SIP server in communication to one or more application servers. At step 405, the call is terminated at PSAP. At step 407, the SIP determines whether it is the last SIP server in a series of SIP servers. If the SIP server is not the last SIP server, then, in step 408, the SIP server forwards or sends the emergency call message to the next SIP server. If the SIP server is the last SIP server, then the SIP server, at step 405, terminates the emergency call at a PSAP.

At step 401, the SIP server receives a call request or message from any type of device or user agent. The SIP server may receive a SIP request or communication. This emergency call message can be received from a terminal (such as the terminal 201 in FIGS. 2A-2E), from an SIP proxy server (such as the SIP proxy server 229 in FIGS. 2B and 2D), from another SIP server (such as SIP server-1 202 in FIG. 2E), or from any other entity that forwards emergency calls initiated by a caller at the terminal. In some embodiments, the SIP server receives the emergency call in the form of an SIP INVITE message.

At step 402, the SIP server detects, identifies or obtains any ECHP information included in or identified by the message. As discussed above with reference to FIGS. 3B-3E, the ECHP information can be located within the header or the body of the received message. The SIP server parses the header and the body, and in particular, the PIDF-LO, to obtain ECHP information. As discussed above, the ECHP information may include a ECHP rule-set and/or include a URL to an ECHP server from where an ECHP rule-set can be obtained.

At step 406, if the message ECHP information includes a URL to an ECHP server, the SIP server communicates with the ECHP server to obtain the ECHP and the corresponding rule-set. The SIP server may send a request to the ECHP server to query or obtain the ECHP corresponding to or identified by the URL. The SIP server may receive from the ECHP server the ECHP. The ECHP server may select the ECHP based on a geographic location or an attribute of a device of a caller corresponding to the SIP request. The ECHP server may select the ECHP as per organization and/or per organization sub-group of the caller, and/or as per the SIP server technology (vendor/model/version), and/or as per the identity of the caller, and/or date and time of the call. In some embodiments, the SIP determines the location information of the device making the call.

If the ECHP information did not include any URL, but instead included the rule-set within the message, then the SIP server need not obtain any rule sets from the ECHP server.

At steps 402 and 403, above, the SIP server obtains and processes the rule set of the ECHP. The SIP server identifies or obtains one or more instructions of the rule set from the ECHP. The SIP server identifies or obtains one or more parameters corresponding to each of the one or more instructions of the rule set of the ECHP. Responsive to the rules of the rule-set, at step 404, the SIP server initiates execution of the instruction(s) with the parameters specified by the rule. The SIP server and/or an application server may execute the instruction(s) with the parameters. The SIP server may communicate with one or more application servers to execute the instructions with the parameters specified by the rule. The SIP server may communicate with more than one application server based on the listed rules and the capabilities of the application servers to execute those rules. In some embodiments, the SIP server may also translate the rules into specific instructions that can be understood by the application server for execution. In one embodiment, the SIP server can also ignore certain rules that are not understood, or cannot be executed or processed by the SIP server. For example, some rules may be directed to a particular version or configuration that is not supported by the SIP server. The SIP server may either forward the un-executed rules to another SIP server or ignore the un-executed rules.

In some embodiments, the SIP server executes the one or more instructions to perform one or more of the following: modification of a presence information data format location object (PIDF-LO) of the SIP request, modifications to one or more headers of the SIP request and application of one or more routing rules. In some embodiments, the SIP server transmits to the application server the instruction to perform one or more of the following: issue a notification, issue an alarm, play an audio message, to monitor the call and to bridge the call. In some embodiments, the SIP server executes one or more of the instructions while the SIP server communicates with an application server for the application server to execute one or more of the instructions.

In some embodiments, such as the one described above with respect to FIG. 2E, two or more SIP servers can be involved in the emergency call processing. At step 407, if the SIP server is determined to be an intermediate SIP server (such as the SIP server-1 202 in FIG. 2E), then the SIP server sends, at step 408, the emergency call message to another SIP server (such as the SIP server-2 251 of FIG. 2E). If, however, it is determined that the SIP server is the last SIP server (such as the SIP server-2 251 of FIG. 2E), which is responsible for terminating the call, the SIP server, at step 405, connects or terminates the received emergency call to a PSAP. The routing of the call to the PSAP may be based on the location of the caller or the terminal used by the caller to initiate the emergency call. In some embodiments, the SIP server routes the call to a PSAP specifically assigned to the location of the caller. In some embodiments, the SIP server terminates the call with the PSAP determined based on location data derived from a presence information data format location object of the SIP request and the rule set of the ECHP. In some embodiments, the PSAP to terminate the call with is determined via processing the rule-set of the ECHP. In some embodiments, the SIP server terminates the call with the PSAP upon completing processing of the rule set of the ECHP. In some embodiments, the SIP server terminates the call with the PSAP while processing the rule set of the ECHP.

By way of further example via operations of one embodiment, an administrator creates an ECHP and stores in the ECHP Server collocated on the LIS. The ECHP is accessible via a URL link. The administrator creates the ECHP allocation rule set per organization and/or per organization sub-group and/or per SIP server technology (vendor/model/version) and/or per location and/or per device and/or per user and/or date and time. A VoIP phone discovers the LIS (as per RFC 5986) and acquires its location by issuing a location request to the LIS using HELD (as per RFC 5985). The LIS returns the location in PIDF-LO format (as per RFC 5491) and the corresponding ECHP URL stored as a new field in the PIDF-LO called the ECHP or stored in an existing field in the PIDF-LO document. Alternatively, if the LIS and a ECHP server are co-located, the LIS returns the location in the PIDF-LO format and a ECHP rule-set stored in the PIDF-LO document. The ECHP URL and the ECHP rule-set may also be included in the SIP message header instead of the PIDF-LO document, which is located in the body of the SIP message. A VoIP phone makes an E911 call. The SIP header includes the caller's location in the PIDF-LO (RFC5491) with the ECHP URL embedded in the PIDF-LO or embedded in the SIP header. The SIP Server fetches the ECHP from the ECHP Server and reads the instructions and parameters for the ECHP. The SIP Server communicates with the appropriate application servers to execute the instructions (e.g., send a monitored call to a specific security desk, issue an email notification, issue a screen pop, etc.) The SIP Server terminates the E-911/NG-911 call to the PSAP as the final destination using the appropriate location data derived from the PIDF-LO and the ECHP rule set. Routing can be done using the appropriate NENA i3/IETF protocols.

In another example operation, the user agent (UA) may not be able to acquire a location and its corresponding ECHP from a LIS server. In this case, the location and ECHP can be inserted in the SIP signaling by an intermediary SIP server on behalf of the UA (as shown in FIGS. 2C and 2D). This intermediary SIP Server would also have LIS functionality and may be programmed to fetch ECHPs from an ECHP server. An administrator creates an ECHP and stores in the ECHP Server. The location is accessible via a URL link. The administrator creates the ECHP allocation rule set per organization and/or per organization sub-group and/or per SIP server technology (vendor/model/version) and/or per location and/or per device and/or per user and/or date and time. A VoIP phone makes a E-911/NG-911 call. The SIP Server uses its LIS function to determine the device's location during the call. The SIP Server sends UA and location information to the ECHP server. The ECHP server selects the appropriate ECHP based on the allocation rules programmed by the administrator and returns the ECHP URL. The acquired location information and the new ECHP are inserted in the SIP body in the PIDF-LO (the ECHP URL may be passed in the SIP header instead) and forwarded to a SIP server downstream. The SIP Server fetches the ECHP from the ECHP Server and reads the instructions and parameters for the ECHP. The SIP Server communicates with the appropriate application servers to execute the instructions (e.g., send a monitored call to a specific security desk, issue an email notification, issue a screen pop, etc.) The SIP Server terminates the E-911/NG-911 call to the PSAP as the final destination While the embodiments of systems and methods discussed above focused on dissemination and execution of call handling policies for emergency calls, it is understood that the above systems and methods can also be used to disseminate and execute call handling policies for calls other than emergency calls. Such calls, not unlike emergency calls, can be based on location based routine, e.g., routing of a call based on the location of the caller. For example, call handling policies can be established to generate special billing, notifying appropriate people, etc. based on a specific location of the call. These call handling policies can be processed by any SIP server that participates in connecting the call.

It is also noted that while the above discussion focused on call handling policies for VOIP calls made using the SIP, it is understood that any of the call handling policies can also be implemented using any other signaling protocol used for creating, maintaining, and terminating VOIP calls. Such signaling protocols can include the H.323 family of protocols.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for processing an emergency service call based on an emergency call handling profile, the method comprising:
   (a) obtaining, by a session initiation protocol (SIP) server responsive to receiving a SIP request for a call to an emergency service, an emergency call handling profile (ECHP) for the call from an ECHP server, the ECHP profile comprising a rule set for handling an emergency service call;
   (b) identifying, by the SIP server, one or more instructions of the rule set from the ECHP profile;
   (c) executing by the SIP server, the one or more instructions of the rule set from the ECHP profile; and
   (d) terminating, by the SIP server responsive to the SIP request, the call with a public safety answering point (PSAP).

2. The method of claim 1, wherein step (a) further comprises identifying, by the SIP server, a uniform resource locator (URL) to the ECHP profile in the SIP request and using the URL to obtain the ECHP profile from the ECHP server.

3. The method of claim 2, further comprising identifying, by the SIP server, the URL embedded in a presence information data format location object of the SIP request.

4. The method of claim 1, wherein step (a) further comprises receiving, by the SIP server, from the ECHP server, the ECHP profile selected by the ECHP server based on one of a geographic location or an attribute of a device of a caller corresponding to the SIP request.

5. The method of claim 1, wherein step (b) further comprises identifying, by the SIP server, one or more parameters corresponding to each of the one or more instructions of the rule set of the ECHP profile.

6. The method of claim 1, wherein step (c) further comprising executing, by the SIP server, an instruction of the one or more instructions to perform one of the following: modification of a presence information data format location object of the SIP request, modifications to one or more headers of the SIP request and application of one or more routing rules.

7. The method of claim 1, wherein step (c) further comprising executing, by the SIP server an instruction of the one or more instructions to perform one of the following: issue a notification, issue an alarm, play an audio message, to monitor the call and to bridge the call.

8. The method of claim 1, wherein executing, by the SIP server, the one or more instructions comprises communicating, by the SIP server, with an application server to execute the one or more instructions.

9. The method of claim 1, wherein step (d) further comprises terminating, by the SIP server, the call with the PSAP determined based on location data derived from a presence information data format location object of the SIP request and the rule set of the ECHP profile.

10. The method of claim 1, wherein step (d) further comprises determining, by the SIP server, that execution of the one or more instructions of the rule set of the ECHP profile is complete and responsive to the determination, terminates the call with the PSAP.

11. A system for processing an emergency service call based on an emergency call handling profile, the system comprising:

an emergency call handling profile (ECHP server) storing a plurality of ECHP profiles, each of the plurality of ECHP profiles comprising a rule set for handling an emergency service call;

a session initiation protocol (SIP) server, responsive to receiving a SIP request for a call to an emergency service, obtaining from the ECHP server for the call an ECHP profile of the plurality of ECHP profiles; and wherein the SIP server identifies one or more instructions of the rule set from the ECHP profile and executes the one or more instructions; and wherein the SIP server, responsive to the SIP request, terminates the call with a public safety answering point (PSAP).

12. The system of claim 11, wherein the SIP server identifies a uniform resource locator (URL) to the ECHP profile in the SIP request and user the URL to obtain the ECHP profile from the ECHP server.

13. The system of claim 12, wherein the URL is embedded in a presence information data format location object of the SIP request.

14. The system of claim 11, wherein the SIP server receives the ECHP profile selected by the ECHP server based on one of a geographic location or an attribute of a device of a caller corresponding to the SIP request.

15. The system of claim 11, wherein the SIP server identifies one or more parameters corresponding to each of the one or more instructions of the rule set of the ECHP profile.

16. The system of claim 11, wherein the SIP server executes an instruction of the one or more of the instructions to perform of the following: modification of a presence information data format location object of the SIP request, modifications to one or more headers of the SIP request and application of one or more routing rules.

17. The system of claim 11, wherein the SIP server executes an instruction of the one or more instructions to perform one or more of the following: issue a notification, issue an alarm, play an audio message, to monitor the call and to bridge the call.

18. The system of claim 11, wherein the SIP server executing the one or more instructions further comprises communicating, by the SIP server, with an application server to execute the one or more instructions.

19. The system of claim 11, wherein the SIP server terminates the call with the PSAP determined based on location data derived from a presence information data format location object of the SIP request and the rule set of the ECHP profile.

20. The system of claim 11, wherein the SIP server determines that execution of the one or more instructions of the rule set of the ECHP profile is complete and responsive to the determination, terminates the call with the PSAP.

* * * * *